(12) United States Patent
Hosseinkhani Loorak et al.

(10) Patent No.: US 11,393,254 B2
(45) Date of Patent: *Jul. 19, 2022

(54) HAND-OVER-FACE INPUT SENSING FOR INTERACTION WITH A DEVICE HAVING A BUILT-IN CAMERA

(71) Applicant: Huawei Technologies Co., Ltd., Guangdong (CN)

(72) Inventors: Mona Hosseinkhani Loorak, Markham (CA); Wei Zhou, Richmond Hill (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,254

(22) Filed: Nov. 25, 2020

(65) Prior Publication Data

US 2021/0081658 A1 Mar. 18, 2021

Related U.S. Application Data

(63) Continuation of application No. 16/535,908, filed on Aug. 8, 2019, now Pat. No. 10,885,322.

(60) Provisional application No. 62/799,623, filed on Jan. 31, 2019.

(51) Int. Cl.
*G06V 40/20* (2022.01)
*G06T 11/00* (2006.01)
*G06V 40/16* (2022.01)

(52) U.S. Cl.
CPC .............. *G06V 40/28* (2022.01); *G06T 11/00* (2013.01); *G06V 40/161* (2022.01); *G06T 2200/24* (2013.01)

(58) Field of Classification Search
CPC . G06T 2200/24; G06T 11/00; G06K 9/00228; G06K 9/00355
See application file for complete search history.

(56) References Cited

U.S. PATENT DOCUMENTS

| | | | |
|---|---|---|---|
| 2004/0113885 A1 | 6/2004 | Genc et al. |
| 2010/0183221 A1 | 7/2010 | Ohtake et al. |
| 2014/0004834 A1 | 10/2014 | Mian et al. |
| 2014/0301603 A1 | 10/2014 | Eilat et al. |
| 2014/0310271 A1 | 10/2014 | Song |
| 2014/0361988 A1 | 12/2014 | Katz et al. |

(Continued)

FOREIGN PATENT DOCUMENTS

| | | |
|---|---|---|
| CN | 103761508 A | 4/2014 |
| CN | 103858073 A | 6/2014 |

(Continued)

OTHER PUBLICATIONS

BMW's Gesture Control. https://driving.ca/bmw/7-series/ auto-news/ news/how-it-works-bmw-gesture-control. Accessed: Sep. 18, 2018. 2018.

(Continued)

*Primary Examiner* — Muhammad N Edun

(57) ABSTRACT

A system including neural network that use deep learning for object detection allows users to interact with images of their face and, in particular, interact with different face landmarks as an input channel for interaction with smart devices. That is, the face is employed as a touch surface for interactions with a device.

21 Claims, 16 Drawing Sheets

(56) References Cited

U.S. PATENT DOCUMENTS

| | | | |
|---|---|---|---|
| 2015/0324001 | A1 | 11/2015 | Yanai et al. |
| 2016/0042224 | A1 | 2/2016 | Liu et al. |
| 2017/0060251 | A1 | 3/2017 | Choi |
| 2018/0173933 | A1* | 6/2018 | Gousev .............. G06K 9/00281 |
| 2018/0324366 | A1 | 11/2018 | Shen et al. |
| 2020/0142495 | A1* | 5/2020 | Steinberg ................ G06T 7/215 |
| 2020/0219295 | A1* | 7/2020 | el Kaliouby ....... G06K 9/00302 |

FOREIGN PATENT DOCUMENTS

| | | |
|---|---|---|
| CN | 103879821 A | 6/2014 |
| CN | 104407694 A | 3/2015 |
| CN | 104656884 A | 5/2015 |
| CN | 108227922 A | 6/2018 |

OTHER PUBLICATIONS

Mobile Vision. https://developers.google.com/vision/. Accessed: Sep. 17, 2018. 2018.

Gilles Bailly, Jörg Müller, Michael Rohs, Daniel Wigdor, and Sven Kratz. 2012. ShoeSense: A New Perspective on Gestural Interaction and Wearable Applications. In Proceedings of the SIGCHI Conference on Human Factors in Computing Systems (CHI '12). ACM, New York, NY, USA, 1239-1248. https://doi.org/10.1145/2207676.2208576 2012.

Cynthia L. Bennett, Jane E, Martez E. Mott, Edward Cutrell, and Meredith Ringel Morris. 2018. How Teens with Visual Impairments Take, Edit, and Share Photos on Social Media. In Proceedings of the 2018 CHI Conference on Human Factors in Computing Systems (CHI '18). ACM, New York, NY, USA, Article 76, 12 pages. https://doi.org/10.1145/3173574.3173650 2018.

Lung-Pan Cheng, Fang-I Hsiao, Yen-Ting Liu, and Mike Y. Chen. 2012. iRotate: Automatic Screen Rotation Based on Face Orientation. In Proceedings of the SIGCHI Conference on Human Factors in Computing Systems (CHI '12). ACM, New York, NY, USA, 2203-2210. https://doi. org/10.1145/2207676.2208374 2012.

Shaowei Chu and Jiro Tanaka.. Hand Gesture for Taking Self Portrait. In Human-Computer Interaction. Interaction Techniques and Environments, Julie A. Jacko (Ed.). Springer Berlin Heidelberg, Berlin, Heidelberg, 238-247. 2011.

S. Chu, F. Zhang, N. Ji, Z. Jin, and R. Pan. 2017. Pan-and-tilt self-portrait system using gesture interface. In 2017 IEEE/ACIS 16th International Conference on Computer and Information Science (ICIS). 599-605. https: //doi.org/10.1109/ICIS.2017.7960063 2017.

Alexander De Luca, Alina Hang, Emanuel von Zezschwitz, and Heinrich Hussmann. 2015. I Feel Like I'm Taking Selfies All Day!: Towards Understanding Biometric Authentication on Smartphones. In Proceedings of the 33rd Annual ACM Conference on Human Factors in Computing Systems (CHI '15). ACM, New York, NY, USA, 1411-1414. https://doi.org/10.1145/2702123.2702141 2015.

Andrew G Howard, Menglong Zhu, Bo Chen, Dmitry Kalenichenko, Weijun Wang, Tobias Weyand, Marco Andreetto, and Hartwig Adam. 2017. Mobilenets: Efficient convolutional neural networks for mobile vision applications. arXiv preprint arXiv:1704.04861 (2017). 2017.

Da-Yuan Huang, Liwei Chan, Shuo Yang, Fan Wang, Rong-Hao Liang, De-Nian Yang, Yi-Ping Hung, and Bing-Yu Chen. 2016. Digitspace: Designing Thumb-to-Fingers Touch Interfaces for One-Handed and Eyes-Free Interactions. In Proceedings of the 2016 CHI Conference on Human Factors in Computing Systems (CHI '16). ACM, New York, NY, USA, 1526-1537. https://doi.org/10.1145/2858036.2858483 2016.

Y. Huang, X. Liu, L. Jin, and X. Zhang. 2015. DeepFinger: A Cascade Convolutional Neuron Network Approach to Finger Key Point Detection in Egocentric Vision with Mobile Camera. In 2015 IEEE International Conference on Systems, Man, and Cybernetics. 2944-2949. https://doi.org/10.1109/SMC.2015.512 2015.

Neel Joshi, Abhishek Kar, and Michael Cohen. 2012. Looking at You: Fused Gyro and Face Tracking for Viewing Large Imagery on Mobile Devices. In Proceedings of the SIGCHI Conference on Human Factors in Computing Systems (CHI '12). ACM, New York, NY, USA, 2211-2220. https://doi.org/10.1145/2207676.2208375 2012.

S. K. Kang, M. Y. Nam, and P. K. Rhee. 2008. Color Based Hand and Finger Detection Technology for User Interaction. In 2008 International Conference on Convergence and Hybrid Information Technology. 229-236. https://doi.org/10.1109/ICHIT.2008.292 2008.

Hsin-Liu (Cindy) Kao, Artem Dementyev, Joseph A. Paradiso, and Chris Schmandt. 2015. NailO: Fingernails As an Input Surface. In Proceedings of the 33rd Annual ACM Conference on Human Factors in Computing Systems (CHI 15). ACM, New York, NY, USA, 3015-3018. https://doi.org/10.1145/2702123.2702572 2015.

James E Katz and Elizabeth Thomas Crocker. 2015. Selfies| selfies and photo messaging as visual conversation: Reports from the United States, United Kingdom and China. International Journal of Communication 9 (2015), 12. 2015.

David Kim, Otmar Hilliges, Shahram Izadi, Alex D. Butler, Jiawen Chen, Iason Oikonomidis, and Patrick Olivier. 2012. Digits: Freehand 3D Interactions Anywhere Using a Wrist-worn Gloveless Sensor. In Proceedings of the 25th Annual ACM Symposium on User Interface Software and Technology (UIST '12). ACM, New York, NY, USA, 167-176. https://doi.org/10.1145/2380116.2380139 2012.

Emiliano Miluzzo, Tianyu Wang, and Andrew T. Campbell. 2010. EyePhone: Activating Mobile Phones with Your Eyes. In Proceedings of the Second ACM SIGCOMM Workshop on Networking, Systems, and Applications on Mobile Handhelds (MobiHeld '10). ACM, New York, NY, USA, 15-20. https://doi.org/10.1145/1851322.1851328 2010.

Pranav Mistry and Pattie Maes. 2009. SixthSense: A Wearable Gestural Interface. In ACM SIGGRAPH Asia 2009 Sketches (SIGGRAPH Asia '09). ACM, New York, NY, USA, Article 11, 1 pages. https://doi.org/10.1145/1667146.1667160 2009.

Behnaz Nojavanasghari, Charles E. Hughes, Tadas Baltrusaitis, and Louis-Philippe Morency. 2017. Hand2Face: Automatic Synthesis and Recognition of Hand Over Face Occlusions. CoRR abs/1708.00370 (2017). arXiv:1708.00370 http://arxiv.org/abs/1708.00370 2017.

Jagdish Lal Raheja, Karen Das, and Ankit Chaudhary. 2012. Fingertip Detection: A Fast Method with Natural Hand. CoRR abs/1212.0134 (2012). arXiv:1212.0134 http://arxiv.org/abs/1212.0134 2012.

Joseph Redmon, Santosh Divvala, Ross Girshick, and Ali Farhadi. 2016. You Only Look Once: Unified, Real-Time Object Detection. In The IEEE Conference on Computer Vision and Pattern Recognition (CVPR). 2016.

I. Scott MacKenzie and Behrooz Ashtiani. 2011. BlinkWrite: efficient text entry using eye blinks. Universal Access in the Information Society 10, 1 (Mar. 1, 2011), 69-80. https://doi.org/10.1007/s10209-010-0188-6 2011.

Marcos Serrano, Barrett M. Ens, and Pourang P. Irani. 2014. Exploring the Use of Hand-to-face Input for Interacting with Head-worn Displays. In Proceedings of the 32Nd Annual ACM Conference on Human Factors in Computing Systems (CHI '14). ACM, New York, NY, USA, 3181-3190. https://doi.org/10.1145/2556288.2556984 2014.

Srinath Sridhar, Anders Markussen, Antti Oulasvirta, Christian Theobalt, and Sebastian Boring. 2017. WatchSense: On- and Above-Skin Input Sensing Through a Wearable Depth Sensor. In Proceedings of the 2017 CHI Conference on Human Factors in Computing Systems (CHI '17). ACM, New York, NY, USA, 3891-3902. https://doi.org/10.1145/3025453.3026005 2017.

Robert Walter, Gilles Bailly, Nina Valkanova, and Jörg Müller. 2014. Cuenesics: Using Mid-air Gestures to Select Items on Interactive Public Displays. In Proceedings of the 16th International Conference on Human-computer Interaction with Mobile Devices and Services (MobileHCI '14). 2014.

Cheng-Yao Wang, Min-Chieh Hsiu, Po-Tsung Chiu, Chiao-Hui Chang, Liwei Chan, Bing-Yu Chen, and Mike Y. Chen. 2015.

(56) References Cited

OTHER PUBLICATIONS

PalmGesture: Using Palms As Gesture Interfaces for Eyes-free Input. In Proceedings of the 17th International Conference on Human-Computer Interaction with Mobile Devices and Services (MobileHCI '15). ACM, New York, NY, USA, 217-226. https://doi.org/10.1145/2785830.2785885 2015.

Jacob O. Wobbrock, Leah Findlater, Darren Gergle, and James J. Higgins. 2011. The Aligned Rank Transform for Nonparametric Factorial Analyses Using Only Anova Procedures. In Proceedings of the SIGCHI Conference on Human Factors in Computing Systems (CHI '11). ACM, New York, NY, USA, 143-146. https://doi.org/10.1145/1978942.1978963 2011.

Koki Yamashita, Takashi Kikuchi, Katsutoshi Masai, Maki Sugimoto, Bruce H. Thomas, and Yuta Sugiura. 2017. CheekInput: Turning Your Cheek into an Input Surface by Embedded Optical Sensors on a Head-mounted Display. In Proceedings of the 23rd ACM Symposium on Virtual Reality Software and Technology (VRST'17). ACM, New York, NY, USA, Article 19, 8 pages. https://doi.org/10.1145/3139131.3139146 2017.

Jian Zhao, Ricardo Jota, Daniel J. Wigdor, and Ravin Balakrishnan. 2016. Augmenting Mobile Phone Interaction with Face-Engaged Gestures. CoRR abs/1610.00214 (2016). arXiv:1610.00214 http://arxiv.org/abs/ 1610.00214 2016.

Eva Eriksson, Thomas Riisgaard Hansen, and Andreas Lykke-Olesen. 2007. Movement-based Interaction in Camera Spaces: A Conceptual Framework. Personal Ubiquitous Comput. 11, 8 (Dec. 2007), 621-632. https://doi.org/10.1007/s00779-006-0134-z 2007.

Jun Gong, Zheer Xu, Qifan Guo, Teddy Seyed, Xiang 'Anthony' Chen, Xiaojun Bi, and Xing-Dong Yang. 2018. WrisText: One-handed Text Entry on Smartwatch Using Wrist Gestures. In Proceedings of the 2018 CHI Conference on Human Factors in Computing Systems (CHI '18). ACM, New York, NY, USA, Article 181, 14 pages. https://doi.org/10. 1145/3173574.3173755 2018.

Sukeshini A. Grandhi, Gina Joue, and Irene Mittelberg. 2011. Understanding Naturalness and Intuitiveness in Gesture Production: Insights for Touchless Gestural Interfaces. In Proceedings of the SIGCHI Conference on Human Factors in Computing Systems (CHI '11). ACM, New York, NY, USA, 821-824. https://doi.org/10.1145/1978942.1979061 2011.

Sean G. Gustafson, Bernhard Rabe, and Patrick M. Baudisch. 2013. Understanding Palm-based Imaginary Interfaces: The Role of Visual and Tactile Cues when Browsing. In Proceedings of the SIGCHI Conference on Human Factors in Computing Systems (CHI '13). ACM, New York, NY, USA, 889-898. https://doi.org/10.1145/2470654.2466114 2013.

Thomas Riisgaard Hansen, Eva Eriksson, and Andreas Lykke-Olesen. 2006. Use Your Head: Exploring Face Tracking for Mobile Interaction. In CHI '06 Extended Abstracts on Human Factors in Computing Systems (CHI EA '06). ACM, New York, NY, USA, 845-850. https://doi.org/10. 1145/1125451.1125617 2006.

Sandra G. Hart and Lowell E. Staveland. 1988. Development of NASA-TLX (Task Load Index): Results of Empirical and Theoretical Research. In Human Mental Workload, Peter A. Hancock and Najmedin Meshkati (Eds.). Advances in Psychology, vol. 52. North-Holland, 139-183. https://doi.org/10.1016/S0166-4115(08)62386-9 1988.

Ken Hinckley and Hyunyoung Song. 2011. Sensor Synaesthesia: Touch in Motion, and Motion in Touch. In Proceedings of the SIGCHI Conference on Human Factors in Computing Systems (CHI '11). ACM, New York, NY, USA, 801-810. https://doi.org/10.1145/1978942.1979059 2011.

Ken Hinckley and Daniel Wigdor. 2002. Input technologies and techniques. In The human-computer interaction handbook: fundamentals, evolving technologies and emerging applications. Taylor and Francis, Chapter 9. 2002.

Matej Kristan, Jiri Matas, Ales Leonardis, Michael Felsberg, Luka Cehovin, Gustavo Fernandez, Tomas Vojir, Gustav Hager, Georg Nebehay, and Roman Pflugfelder. 2015. The Visual Object Tracking VOT2015 Challenge Results. In The IEEE International Conference on Computer Vision (ICCV) Workshops. 2015.

Manu Kumar and Terry Winograd. 2007. Gaze-enhanced Scrolling Techniques. In Proceedings of the 20th Annual ACM Symposium on User Interface Software and Technology (UIST '07). ACM, New York, NY, USA, 213-216. https://doi.org/10.1145/1294211.1294249 2007.

Gierad Laput, Robert Xiao, Xiang 'Anthony' Chen, Scott E. Hudson, and Chris Harrison. 2014. Skin Buttons: Cheap, Small, Low-powered and Clickable Fixed-icon Laser Projectors. In Proceedings of the 27th Annual ACM Symposium on User Interface Software and Technology (UIST '14). ACM, New York, NY, USA, 389-394. https://doi.org/10.1145/2642918.2647356 2014.

Oliver Lemon. 2012. Conversational Interfaces. Springer New York, New York, NY, 1-4. https://doi.org/10.1007/978-1-4614-4803-7_1 2012.

Wei Liu, Dragomir Anguelov, Dumitru Erhan, Christian Szegedy, Scott Reed, Cheng-Yang Fu, and Alexander C. Berg. 2016. SSD: Single Shot MultiBox Detector. In Computer Vision—ECCV 2016, Bastian Leibe, Jiri Matas, Nicu Sebe, and Max Welling (Eds.). Springer International Publishing, Cham, 21-37 2016.

Alan Lukezic, Tomas Vojir, Luka Cehovin Zajc, Jiri Matas, and Matej Kristan. 2017. Discriminative Correlation Filter With Channel and Spatial Reliability. In The IEEE Conference on Computer Vision and Pattern Recognition (CVPR). 2017.

Marwa Mahmoud, Tadas Baltrušaitis, Peter Robinson, and Laurel D. Riek. 2011. 3D Corpus of Spontaneous Complex Mental States. In Affective Computing and Intelligent Interaction, Sidney D'Mello, Arthur Graesser, Björn Schuller, and Jean-Claude Martin (Eds.). Springer Berlin Heidelberg, Berlin, Heidelberg, 205-214 2011.

Marwa Mahmoud and Peter Robinson. 2011. Interpreting Hand-Over-Face Gestures. In Affective Computing and Intelligent Interaction. Springer Berlin Heidelberg, Berlin, Heidelberg, 248-255 2011.

* cited by examiner

HAND-OVER-FACE INPUT SENSING FOR INTERACTION WITH A DEVICE HAVING A BUILT-IN CAMERA

RELATED APPLICATION DATA

The present application is a continuation of U.S. patent application Ser. No. 16/535,908, filed Aug. 8, 2019, which claims priority to U.S. provisional patent application Ser. No. 62/799,623, filed Jan. 31, 2019, the contents of both documents being incorporated herein by reference.

TECHNICAL FIELD

The present application relates, generally, to interactions with devices having a built-in camera and, more specifically, to hand-over-face input sensing for such interaction.

BACKGROUND

With the success of electronic devices that include touch based input devices, such as touchscreens, touchpads, trackpads, smartwatches, interactive blackboards and the like, touch interaction has become the dominant method of interacting with such electronic devices. Touch interaction can include single touch or multi-touch interaction, such as tapping, pinching, flicking, etc. on a touch based input device.

However, there are many scenarios where touch interaction with the touch based input device cannot be detected. Also, there are many scenarios where touch interaction with the touch based input device is not desirable or feasible, for example, when a user is driving a car and wishes to interact with the touch based input device of the vehicle, or when the touch based input device is outside the reach of the user. In these scenarios, a user could benefit from alternative interaction mechanisms for interacting with an electronic device that does not involve touch interaction.

Another example scenario relates to the touch interaction with the touch screen displays of mobile phones (e.g., smartphones). A generation is growing up with social media, and one aspect of current social media social media and sharing of self-portrait photos (also known as "selfies") and videos captured using smartphones. Some popular smartphone applications allow a user to select a "filter." Often, the filter adds augmented reality elements to an image or a video. To select a filter and, thereby, select one or more available augmented reality elements to add to an image or video, the user typically touches the screen and scrolls through various filter choices.

SUMMARY

In accordance with a first embodiment of a first aspect of the present application, there is provided a method of interaction with an electronic device. Image data for an image captured by a camera is processed to determine a type of a hand gesture in the image and a location of the hand gesture in the image relative to a plurality of face landmark locations in the image. An action associated with the hand gesture based on the type of the hand gesture and the location of the hand gesture relative to the plurality of face landmark locations in the image is determined. The determined action is performed.

In accordance with a second embodiment of the first aspect of the present application, there is provided an electronic device comprising a camera and a processor. The processor is configured to process image data for an image captured by the camera to determine a type of a hand gesture in the image and a location of the hand gesture in the image relative to a plurality of face landmark locations in the image. The processor is further configured to determine an action associated with the hand gesture based on the type of the hand gesture and the location of the hand gesture relative to the plurality of face landmark locations in the image. The processor is further configured to perform the determined action.

In accordance with a third embodiment of the first aspect of the present application, there is provided a non-transitory machine-readable medium having tangibly stored thereon executable instructions for execution by a processor of an electronic device. The executable instructions, in response to execution by the processor, cause the electronic device to process image data for an image captured by a camera to determine a type of a hand gesture in the image and a location of the hand gesture in the image relative to a plurality of face landmark locations in the image. The executable instructions, in response to execution by the processor, further cause the electronic device to determine an action associated with the hand gesture based on the type of the hand gesture and the location of the hand gesture relative to the plurality of face landmark locations in the image. The executable instructions, in response to execution by the processor, further cause the electronic device to perform the determined action.

In some or all examples of the first aspect, an indication of the determined action is provided.

In some or all examples of the first aspect, the image data for the image is processed to determine the plurality of face landmark locations in the image.

In some or all examples of the first aspect, the image data for the image is processed to determine the location of the hand gesture.

In some or all examples of the first aspect, a selected face landmark is determined from the plurality of face landmarks having a greatest proximity to the location of the hand gesture based on the location of the hand gesture and the plurality of face landmark locations.

In some or all examples of the first aspect, determining the action is further based on the selected face landmark.

In some or all examples of the first aspect, performing the determined action comprises selecting, based on the selected face landmark, an augmented reality element to add to the image based on a spatial association between augmented reality elements and face landmarks, and processing the image data for the image and image data for the selected augmented reality element to generate a processed image having the selected augmented reality element added to the image. In some or all examples of the first aspect, performing the determined action further comprises displaying the processed image on a display screen of the electronic device.

In some or all examples of the first aspect, performing the determined action comprises increasing a zoom level of the camera, and causing the camera to capture a new image at the increased zoom level.

In some or all examples of the first aspect, performing the determined action comprises providing a command to an audio control element of the electronic device to change a volume level of the audio control element.

In some or all examples of the first aspect, the image data is processed for the image to determine a type of a second hand gesture in the image and a location of the second hand gesture in the image relative to a plurality of face landmark locations in the image, an action associated with the second hand gesture is determined based on the type of the second hand gesture and the location of the second hand gesture relative to the plurality of face landmark locations in the image, and determined second action is performed.

In accordance with a first embodiment of a second aspect of the present application, there is provided a method of sensing an interaction with an electronic device comprising a camera. The method includes: receiving image data for one or more images captured by the camera; processing the image data for the one or more images to determine a type for a hand gesture and a location of the hand gesture in the one or more images; processing the image data for the one or more images to determine a plurality of face landmark locations in the image; comparing the location of the hand gesture to each face landmark location of the plurality of face landmark locations; identifying, based on the comparing and the type for the hand gesture, an action; and providing an indication of the action.

In accordance with a second embodiment of the second aspect of the present application, there is provided an electronic device comprising: a camera adapted to capture one or more images; a display screen; and a processor. The processor is configured to: process image data for the one or more images received from the camera to determine a type for a hand gesture and a location of the hand gesture in the one or more images; process image data for the one or more images received from the camera to determine a plurality of face landmark locations in the image; compare the location of the hand gesture to each face landmark location of the plurality of face landmark locations; identify, based on the comparing and the type for the hand gesture, an action; and provide an indication of the action.

In accordance with a third embodiment of the second aspect of the present application, there is provided a non-transitory machine-readable medium storing instructions, wherein execution of the instructions causes a processor of an electronic device comprising a camera to: receive image data for one or more images captured by the camera; process the image data for the one or more images to determine a type for a hand gesture and a location of the hand gesture in the one or more images; process the image data for the one or more images to determine a plurality of face landmark locations in the one or more images; compare the location of the hand gesture to each face landmark location of the plurality of face landmark locations; identify, based on the comparing and the type for the hand gesture, an action; and provide an indication of the action.

In some or all examples of the second aspect, a selected face landmark having a selected face landmark location, is identified based on the comparing the selected face landmark, among the plurality of face landmark locations, having a greatest proximity to the location of the hand gesture.

In some or all examples of the second aspect, the identifying the action is further based on the selected face landmark.

In some or all examples of the second aspect, the action comprises adding an augmented reality element to the image and the method further comprises selecting, based on the selected face landmark, the augmented reality element to add to the image.

In some or all examples of the second aspect, the image data is processed for the one or more images, based on the identifying, to generate a processed image.

In some or all examples of the second aspect, the image data is processed to add the augmented reality element spatially associated with the selected face landmark to the processed image.

In some or all examples of the second aspect, the processed image is provided to a display screen of the electronic device.

In some or all examples of the second aspect, a command is provided to an audio control element based on the action.

In some or all examples of the second aspect, the image data for the one or more images is processed to determine a plurality of face landmark locations in the image comprises detecting, using a computer vision method, the plurality of face landmarks and the location of each face landmark of the plurality of the face landmarks.

In some or all examples of the second aspect, the plurality of face landmarks are tracked in the one or more images.

In some or all examples of the second aspect, the image data for the one or more images is processed to determine a type for a second hand gesture and location, of the second hand gesture, in the image, the location of the second hand gesture is compared to each face landmark location of the plurality of face landmark locations, and a second action is identified based on the comparing. In some or all examples of the second aspect, an indication of the second action is provided.

In some or all examples of the second aspect, the image data for the one or more images is processed to determine a type for a hand gesture and a location of the hand gesture in the one or more images comprises detecting, using a detector computer vision method, the type for the hand gesture and location, of the hand gesture, in the one or more images.

Other aspects and features of the present disclosure will become apparent to those of ordinary skill in the art upon review of the following description of specific implementations of the application in conjunction with the accompanying figures.

BRIEF DESCRIPTION OF THE DRAWINGS

Reference will now be made, by way of example, to the accompanying drawings which show example implementations; and in which.

DETAILED DESCRIPTION OF EXAMPLE EMBODIMENTS

Figure 1:
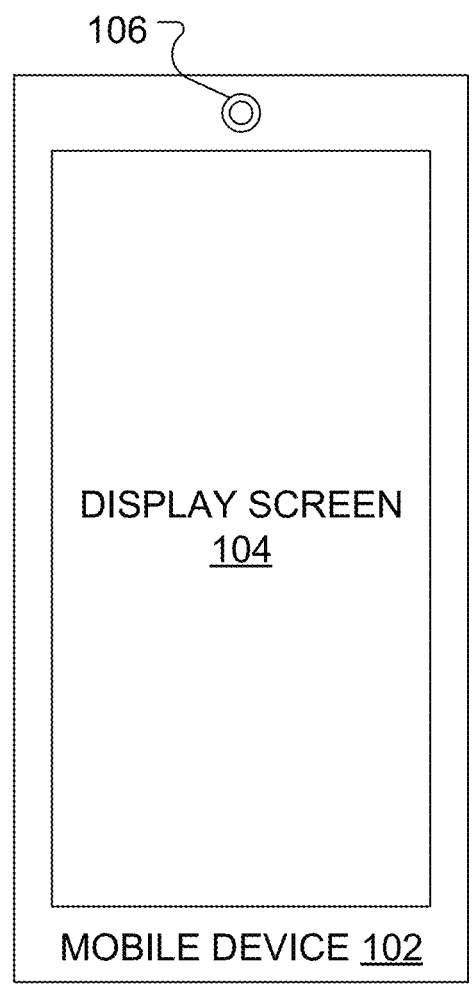
FIG. 1 illustrates, in a front elevation view, a mobile device.

Touch input is, currently, the leading interaction mechanism with electronic devices that include a touchscreen display, such as mobile phones, tablets, televisions, vehicle infotainment systems, smartphones, and the like. However, touch is challenging or limited in certain situations, such as when the device is in a certain distance from the user. One situation relates to taking self-portraits from a distance and augmenting face with one or more of many available augmented reality (AR) elements. Specifically, in certain use cases related to the human face, such as performing virtual makeup, adding AR elements to the face, and in photo face editing scenarios, it may be considered that touch interaction is not the best option.

Users often use touch input for interaction with the device, such as for example, navigating through different levels of menus to select a facial element and select an applicable action to apply to the selected facial element. Using touch input for interaction with the device requires that the touch surface of the device be maintained at a reachable distance. This need to maintain a reachable distance makes touch interaction with the device difficult when the device is being maintained at a given distance that is beyond a reachable distance, such as when the user wants to take a selfie or other photos from the given distance. Additionally, interaction with the device is also made difficult by cold weather during which taking off gloves to perform a touch input may be considered to be onerous.

It may also be considered that using touch input does not allow more than one person to interact with the device due to the screen size of the touchscreen display of the device. However, in use cases such as photo taking, multiple users can be present in the photo and each user among the multiple users might want to have individual control over their appearance.

In overview, it is proposed herein to take advantage of human facial structure to allow users to interact with their face and, in particular, interact with different face landmarks for touch interaction with an electronic device that includes a camera. That is, the face is employed as a touch surface, or a touch based input device, for touch interactions with an electronic device that includes a camera.

The present application relates to an electronic device that includes a camera that allows a user to interact with different face landmarks as an input channel for touch interaction with the electronic device. That is, the face is employed as a touch surface or touch based input device for touch interactions with the electronic device. The camera of the electronic device captures one or more images of a user's touch interaction with different face landmarks, and a processor of the electronic device receives the one or more captured images and processes the one or more captured images to determine a type of touch interaction performed by the user. The processor may also determine an action to be performed by an application running on the electronic device or a hardware component of the electronic device based on the determined type of touch interaction, and transmit a command to the application or hardware component to perform the action.

According to an aspect of the present application, there is provided a method of augmenting an image captured by a camera of a device, the device having a display screen. The method includes receiving an image from the camera, receiving an indication of a fingertip location in the image, receiving indications of a plurality of face landmark locations in the image, comparing the fingertip location to each face landmark location of the plurality of face landmark locations, identifying, based on the comparing, a selected face landmark, the selected face landmark having a selected face landmark location, among the plurality of face landmark locations, having a greatest proximity to the fingertip location, processing the image to generate a processed image, the processed image including an additional element spatially associated with the selected face landmark and providing the processed image to the display screen. In other aspects of the present application, a device is provided having a graphics element for carrying out this method and a machine-readable medium is provided for adapting a processor in a device to carry out this method.

According to another aspect of the present application, there is provided a method of receiving an instruction. The method includes receiving a plurality of images from a camera element, receiving an indication of a gesture, an indication of a plurality of face landmarks and a location of the gesture in relation to a particular face landmark among the plurality of face landmarks, selecting, based on the indication of the gesture and the location of the gesture, an instruction and providing the instruction to a processor.

Other aspects and features of the present application will become apparent to those of ordinary skill in the art upon review of the following description of specific implementations of the application in conjunction with the accompanying figures.

FIG. 1 illustrates, in a front elevation view, an electronic device according to an embodiment of the present application. In the example embodiment illustrated in FIG. 1, the electronic device is a mobile device 102. Examples of mobile devices 102 includes mobile phones, smartphones, tablets, laptop computers, smart television sets. The mobile device 102 includes a display screen 104 and a front-facing lens 106 of a camera 206 (see FIG. 2) of the mobile device 102.

Figure 2:
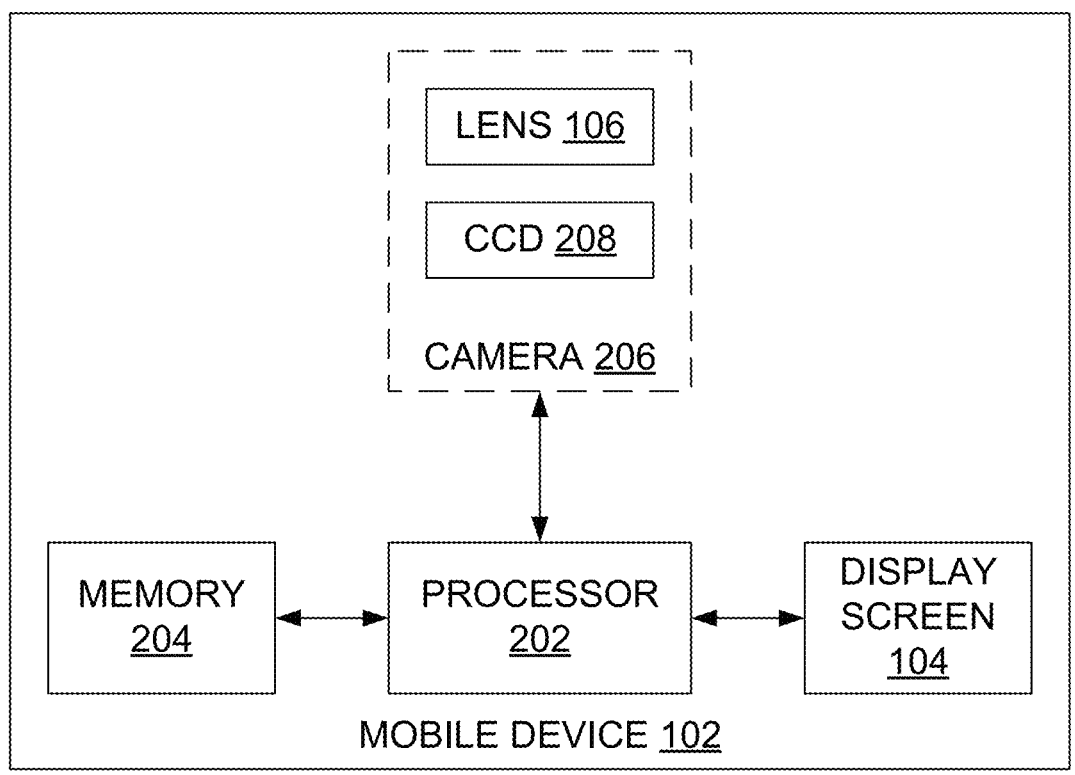
FIG. 2 illustrates, schematically, elements of the interior of the mobile device of FIG. 1, including a camera element.

FIG. 2 illustrates, schematically, a block diagram of components of the mobile device 102 of FIG. 1. The mobile device 102 includes a processor 202 that controls the overall operation of the mobile device 102. The processor 202 is coupled to and interacts with various other components of the mobile device 102, including a memory 204, a camera 206 and the display screen 104, shown in FIG. 1. The processor 202 is coupled to and interacts with the various other components via, for example, a bus. Components of the camera 206 include a charge-coupled device (CCD) 208 and the front-facing lens 106, shown in FIG. 1.

Figure 3:
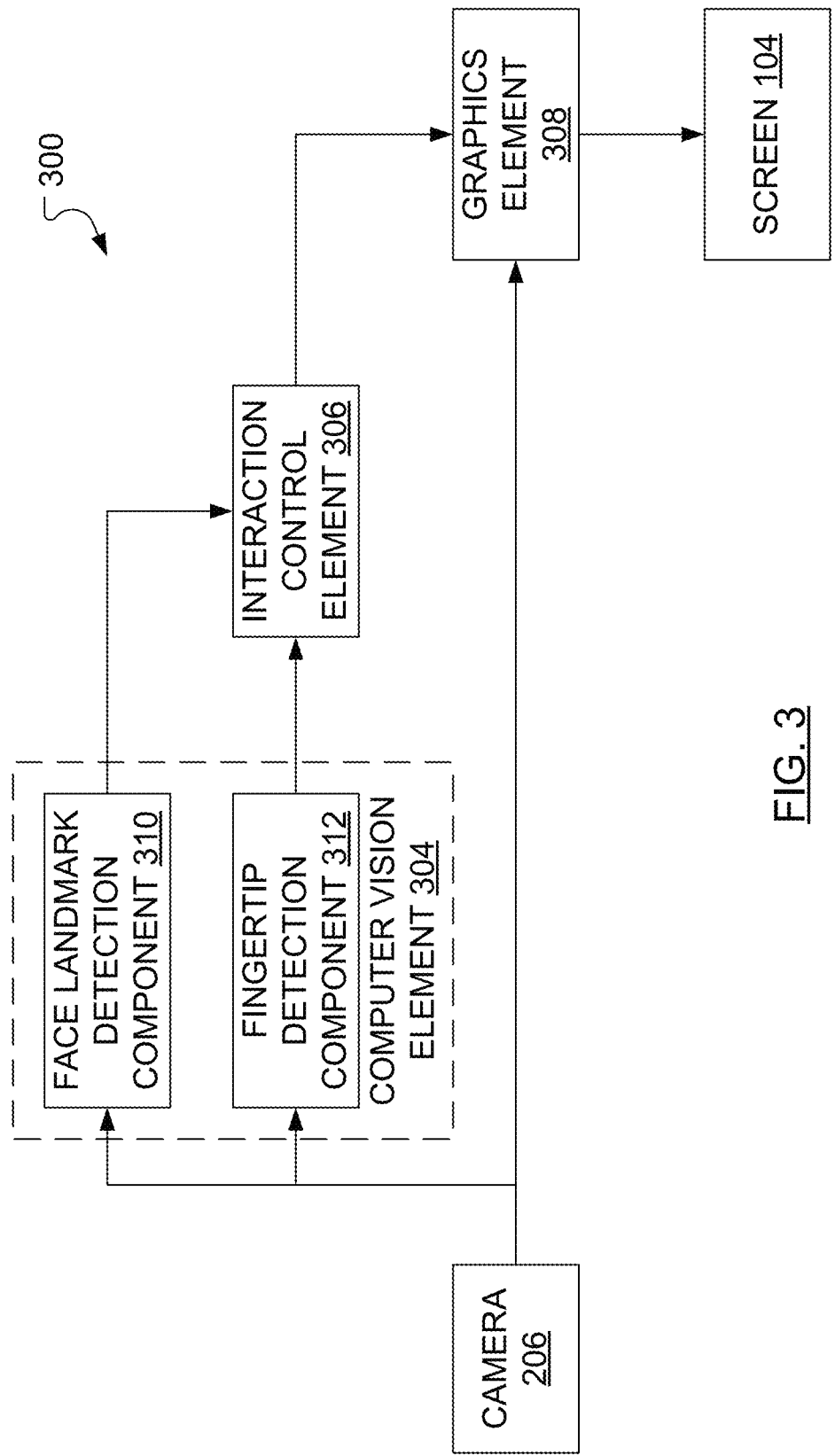
FIG. 3 illustrates a system adapted to carry out aspects of the present application, the system including a computer vision element, an interaction element and a graphics element.

FIG. 3 illustrates a system 300 adapted to carry out aspects of the present application. The system 300 includes a computer vision element 304, an interaction control element 306 and a graphics element 308. The system 300 communicates with the camera 206 and the display screen 104, both of which are shown in FIG. 1, as described below. In an embodiment, the system 300 is a software system and the computer vision element 304, the interaction control element 306 and the graphics element 308 are software elements or software modules of the software system 300. The software system 300 (and the computer vision element 304, the interaction control element 306 and the graphics element 308) include machine-readable instructions that may be stored in the memory 204 and the machine-readable instructions may be executed by the processor 202.

The computer vision element 304 and the graphics element 308 receive image data from the camera 206. The image data is representative of an image captured by the camera 206. The computer vision element 304 is illustrated as having two components. The first component is a face landmark detection component 310. The second computer vision component is a fingertip detection component 312. The face landmark detection component 310 is software of the computer vision element 304 that is configured to: receive image data representative of an image captured by the camera; process the image data using a computer vision method to detect a face landmark in the image, identify the detected face landmark, and generate a location of the identified face landmark in the image; and output a label indicative of the identified face landmark and the location of the identified face landmark in the image. The fingertip detection component 312 is software of the computer vision element 304 that is configured to receive image data representative of an image captured by the camera; process the image data using a computer vision method to detect a fingertip in the received image data; determine a location of the fingertip in the image; and output a label indicative of the detected fingertip and the location of the detected fingertip in the image. The computer vision methods used to process the image data representative of the captured image include for example, image classification, object detection, object tracking, sematic segmentation, feature detection and matching, and context and scene understanding.

Figure 4:
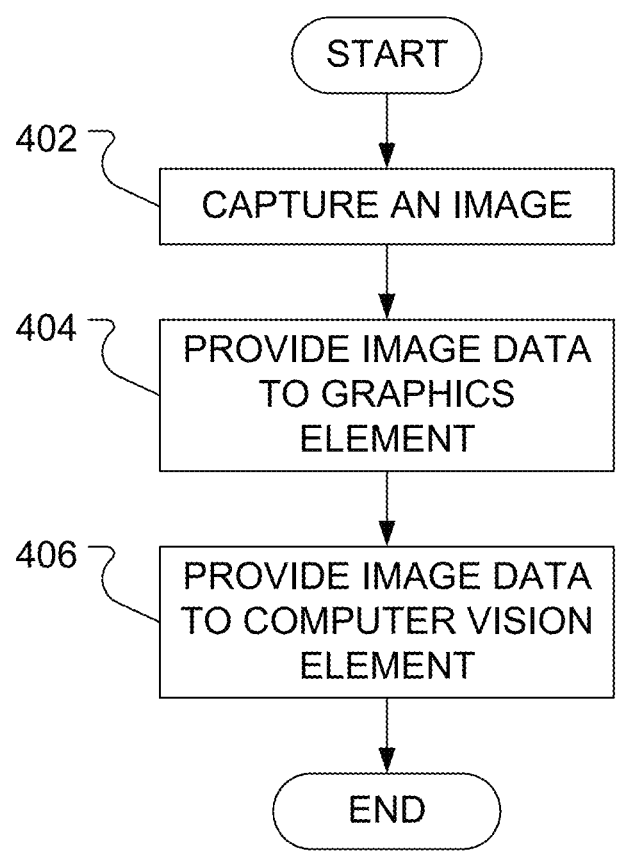
FIG. 4 illustrates example steps in a method of operation of the camera element of FIG. 2 in accordance with aspects of the present application.

Example steps in a method of operation of the camera 206 are illustrated in FIG. 4. In a manner typical of mobile device operation, the camera 206 captures (step 402) an image (or a sequence of images for a video) through the camera lens 106. The camera 206 provides image data representative of the captured image to the processor 102, which executes the machine-readable instructions of the system 300. In particular, the camera 206 provides (step 404) the image data to the graphics element 308. In aspects of the present application, the graphics element 308 is a rendering engine.

Figure 5:
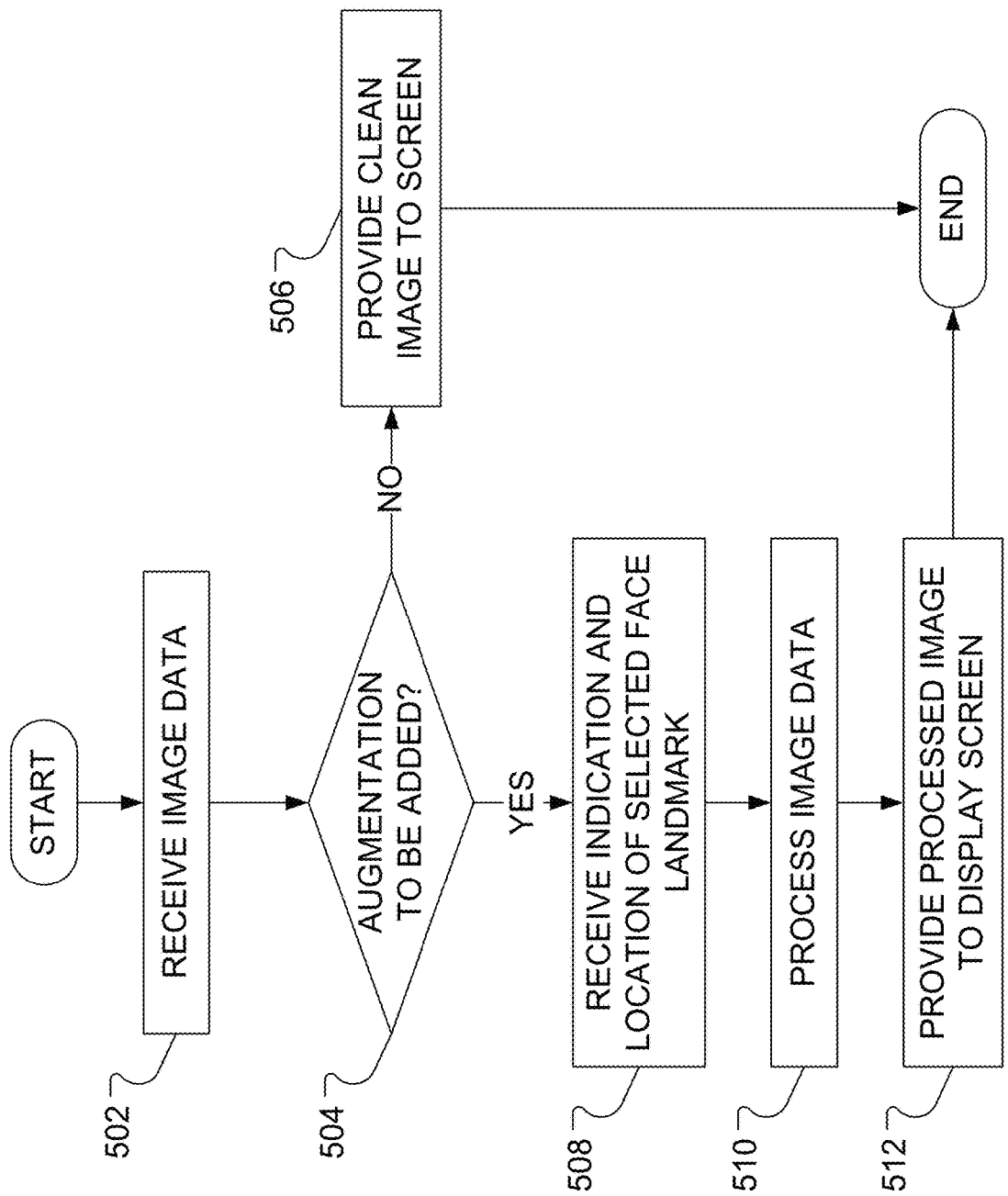
FIG. 5 illustrates example steps in a method of operation of the graphics element of FIG. 3 in accordance with aspects of the present application.

Example steps in a method of operation of the graphics element 308 are illustrated in FIG. 5. In a manner typical of mobile device operation, the graphics element 308 receives (step 502) the image data representative of the captured image from the camera 206. The graphics element 308 then determines (step 504) whether augmentation is to be added to the image.

Upon determining (step 504), based on information provided by the interaction control element 306, that augmentation is not to be added to the image, the graphics element 308 then provides (step 506) the image data representative of the clean (i.e., non-augmented) image to the display screen 104 of the mobile device 102 for displaying the image thereon in a manner typical of mobile device 102 operation.

Upon determining (step 504), based on information provided by the interaction control element 306, that augmentation is to be added to the image, the graphics element 308 then receives (step 508), from the interaction control element 306, an indication of a selected face landmark along with an indication of the location, in the image, of the selected face landmark. That is, the graphics element 308 receives (step 508), from the interaction control element 306, a location (e.g., pixel coordinates) of the selected face landmark that aligns with the fingertip location. For example, the interaction control element 306 may indicate coordinates, in the image, for a specific point on a chin.

The graphics element 308 also receives (step 508), from the interaction control element 306, an indication of an additional element. The additional element may be referred to hereinafter as an augmented reality element or an AR element. The additional element may be selected from a catalogue of AR elements that are associated with the selected face landmark. The catalogue of AR elements may be stored, for example, in the memory 204 in a manner that is accessible to the interaction control element 306 executed on the processor 202. In one example, if the forehead is the selected face landmark, the catalogue of AR elements that are associated with the forehead may comprise many hats, such as: a Stetson; a bowler; a baseball cap; a crown; a tiara; and a hockey helmet.

Based on the received information about the selected face landmark, the graphics element processes (step 510) the image data to produce augmented image data. The result of the processing (step 510) of the image data may be considered to be processed image data or augmented image data. The augmented image data includes the additional element spatially associated with the selected face landmark. In an alternative, wherein the action is an increase in zoom level, the processed image data may be image data that has been subjected to a zoom. Indeed, in another alternative, wherein the action is an increase in audio volume level, the graphics elements 308 may not process (step 510) the image data. Instead, the graphics elements 308 may signal an audio control element (not shown) with a command to increase audio volume. The audio control element may then appropriately control and audio component.

The graphics element 308 may then provide (step 512) the processed image data to the display screen 104 of the mobile device 102.

Returning to FIG. 4, the camera 206 also provides (step 406) the image data to the computer vision element 304. Although the provision (step 404), by the camera element 206, of the image data to the graphics element 308 is illustrated, in FIG. 4, as preceding the provision (step 406), by the camera 206, of the image data to the computer vision element 304, it should be clear, to a person of ordinary skill in the art that the order may be reversed or the two steps may happen in parallel, that is, nearly simultaneously.

Figure 6:
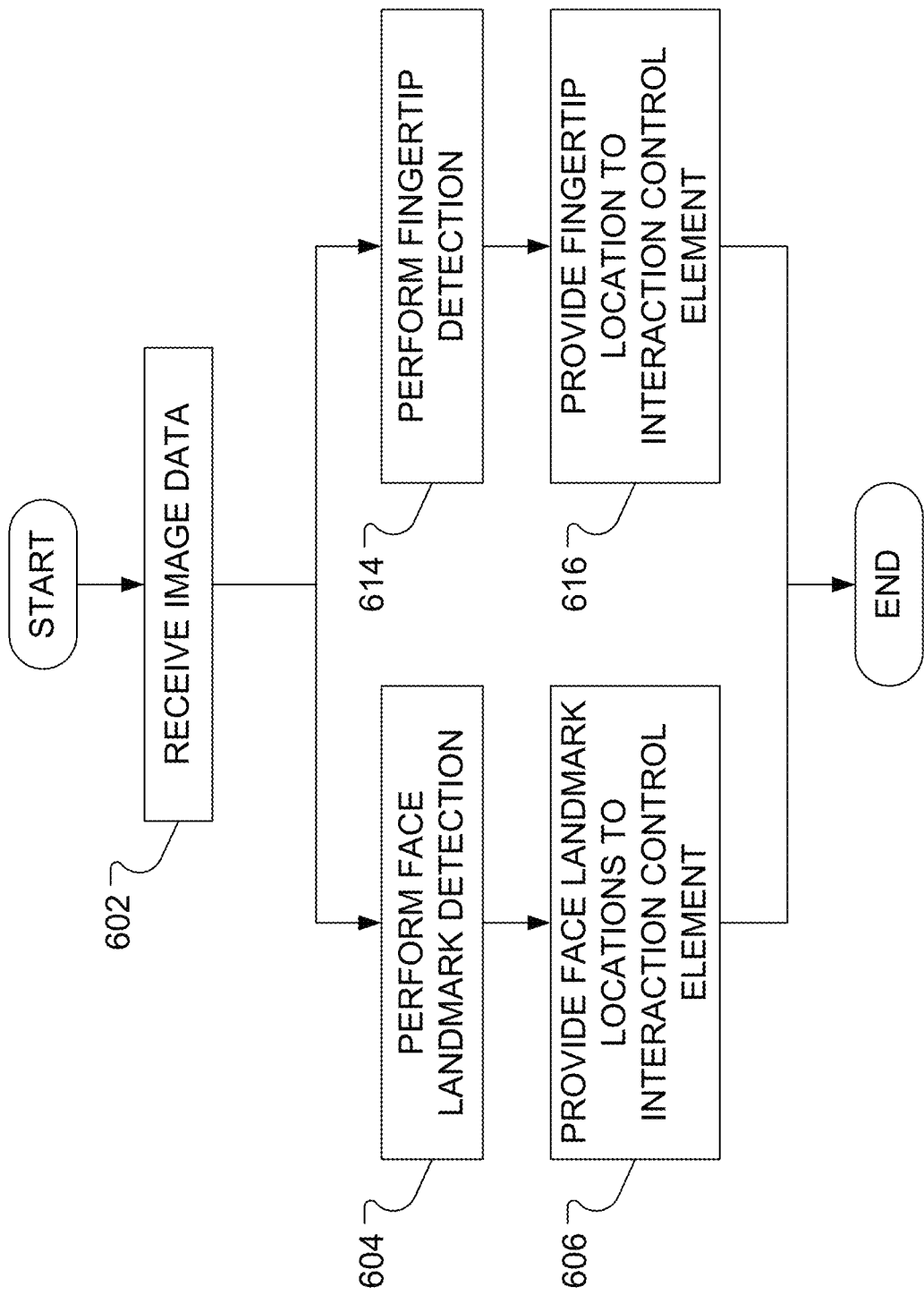
FIG. 6 illustrates example steps in a method of operation of the computer vision element of FIG. 3 in accordance with aspects of the present application.

Example steps in a method of operation of the computer vision element 304 are illustrated in FIG. 6. The computer vision element 304 receives (step 602) image data from the camera 206. It may be stated, more precisely, that, in many embodiments, the computer vision element 304 receives image data (step 602) from the camera 206. In parallel, the face landmark detection component 310 performs (step 604) face landmark detection and the fingertip detection component 312 performs (step 614) fingertip detection. The face landmark detection may be performed (step 604) on the image data representative of each captured image using a learning-based object detector, which has been trained to detect and localize face landmarks in the captured images (e.g., provide coordinates of the detected face landmark in the captured image). The learning-based object detector may be implemented using a feature extractor (not shown) which has been trained to detect face landmarks, a classifier (not shown) that classifies the detected face landmarks and a localizer (not shown) that outputs the location, in the captured image, of the detected face landmarks. The feature extractor, the classifier and the localizer may be implemented using distinct, trained neural networks. Alternatively, the object detector may be implemented using a single deep neural network that has been trained for face landmark detection and localization using a training dataset comprising samples of different face landmarks.

The learning-based object detector may be designed using an application development platform. Google® LLC of Mountain View, Calif. has an application development platform called Firebase. Part of the Firebase platform is a machine learning Software Development Kit (SDK) called "ML Kit." Conveniently, aspects of ML Kit relate specifically to face detection (see firebase.google.com/docs/ml-kit/detect-faces).

Beyond merely locating face landmarks, tracking of the face landmarks, that is, repetitive face landmark detection, may be considered to assist the provision of real-time interactions.

The fingertip detection may be performed (step 614) using a learning-based object detector that is trained to detect fingertips in images and localize the fingertip (e.g., output the location of the fingertip in the image). The learning-based object detector may be implemented using a feature extractor that has been trained to detect fingertips and a localizer that outputs the location, in the image of the detected fingertips. The feature extractor and the localizer may be implemented using distinct, trained neural networks. Alternatively, the learning-based object detector may be implemented using a deep neural network that has been trained for fingertip detection and localization using a training dataset comprising samples of different fingertips. Beyond merely locating the fingertip, tracking of the fingertip, that is, repetitive fingertip detection, may be considered to assist the provision of real-time interactions.

Upon completion of the performing (step 604) of face landmark detection, the face landmark detection component 310 provides (step 606) a location of a variety of face landmarks to the interaction control element 306. The face landmarks may, for example, include: left eye position; right eye position; left cheek position; right cheek position; tip of nose; left mouth position; right mouth position; and bottom mouth position. Locations for each of the face landmarks may be expressed as coordinates in relation to a frame of reference for the captured image.

Upon completion of the performing (step 614) of fingertip detection, the fingertip detection component 312 provides (step 616) a location of a user's fingertip to the interaction control element 306. The location of the user's fingertip may be expressed as coordinates in relation to a reference frame of the captured image.

Figure 7:
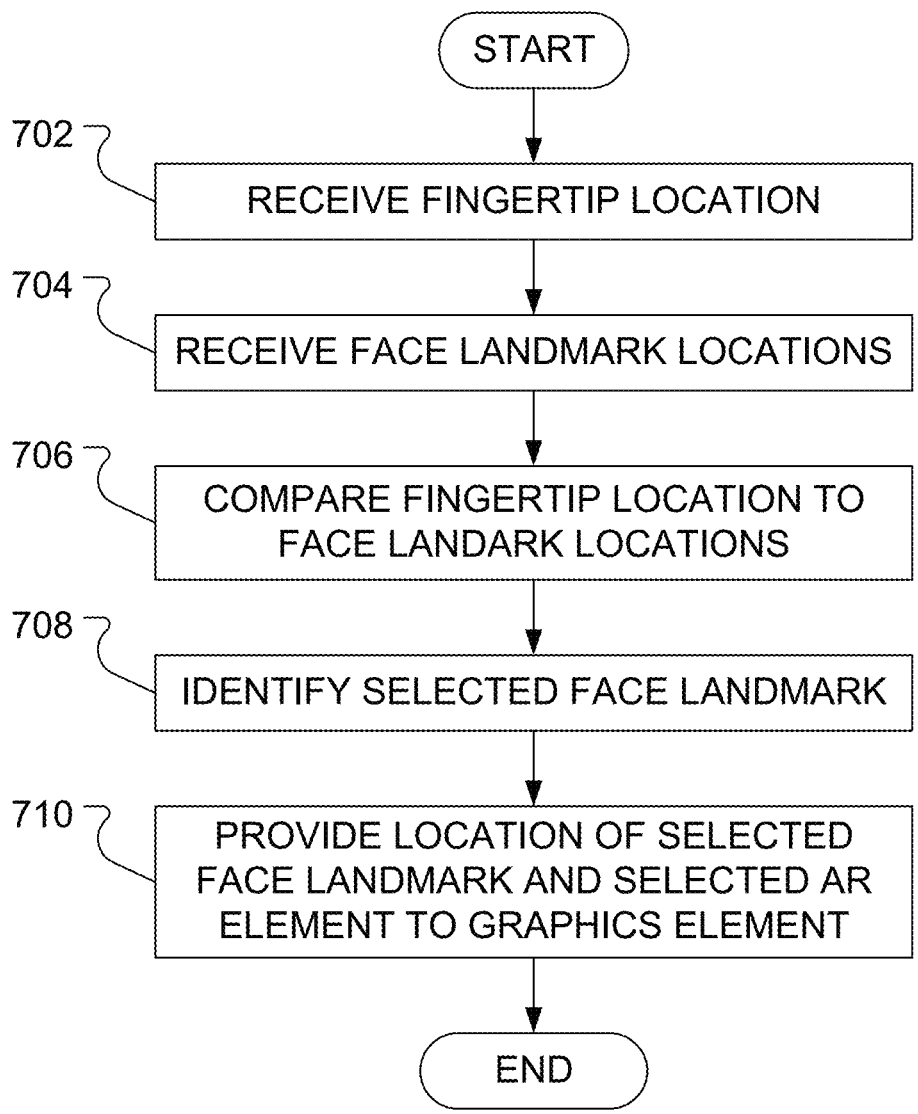
FIG. 7 illustrates example steps in a method of operation of the interaction control element of FIG. 3 in accordance with aspects of the present application.

Example steps in a method of operation of the interaction control element 306 are illustrated in FIG. 7.

The interaction control element 306 receives (step 702) the label that includes the fingertip location coordinates from the fingertip detection component 312. The interaction control element 306 also receives (step 704) the face landmark locations from the face landmark detection component 310. The interaction control element 306 then compares (step 706) the fingertip location to the locations of the various face landmarks. The interaction control element 306 determines (step 708) whether a location of a face landmark corresponds with a location of a fingertip. This determination could be based on finding a result for greatest proximity (e.g., minimum distance) between various ones of the facial landmarks and the fingertip location. When there is a correspondence, the interaction control element 306 identifies (step 708) that one of the face landmarks has been selected by the user. The interaction control element 306 may consider the identified face landmark to be a "selected" face landmark. The selected face landmark location may, for example, be a face landmark location, among the plurality of face landmark locations, determined to have a greatest proximity (e.g., a minimum distance) to the fingertip location. Based on the selected face landmark, the interaction control element 306 may select an AR element. The interaction control element 306 then provides (step 710), to the graphics element 308, the location of the selected face landmark and the selected AR element.

As discussed hereinbefore in the context of FIG. 5, responsive to receiving (step 508) the label associated with location of the selected face landmark, the graphics element processes (step 510) the image data representative of the image to produce augmented image data. The graphics element 308 then provides (step 512) the augmented image data to the display screen 104 of the mobile device 102. In one example of processing (step 510) the received image data, the graphics element 308 processes (step 510) the image data to include the selected AR element superimposed over the selected face landmark.

A first example of use of aspects of the present application relates to adding facial AR elements when taking selfie photos.

Figure 8:
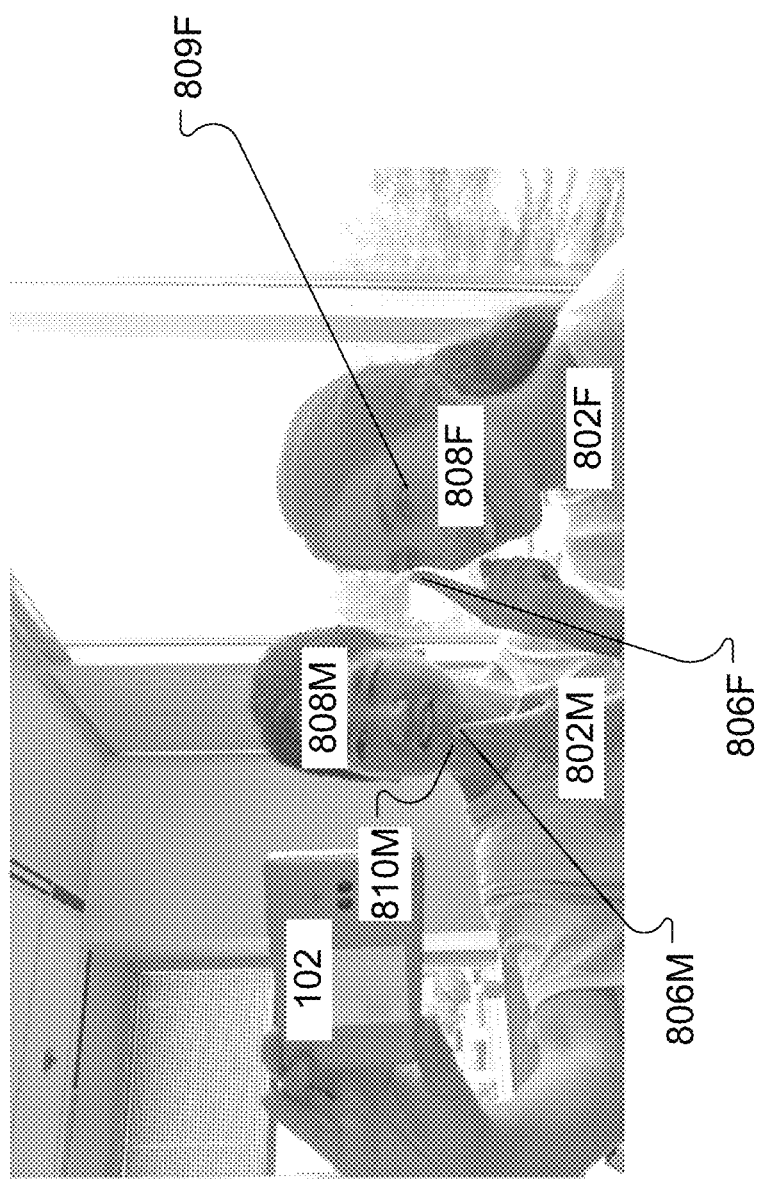
FIG. 8 illustrates a first person and a second person in the act of preparing to take a selfie with the mobile device.

FIG. 8 illustrates a first person 802M and a second person 802F in the act of preparing to take a selfie with the mobile device 102. The first person 802M has a finger 806M and face 808M with a chin 810M. The first person 802M is illustrated as touching the finger 806M to the chin 810M. The second person 802F has a finger 806F and face 808F with a pair of eyes 809F. The second person 802F is illustrated as touching the finger 806F to the face 808F near one eye among the pair of eyes 809F.

Figure 9:
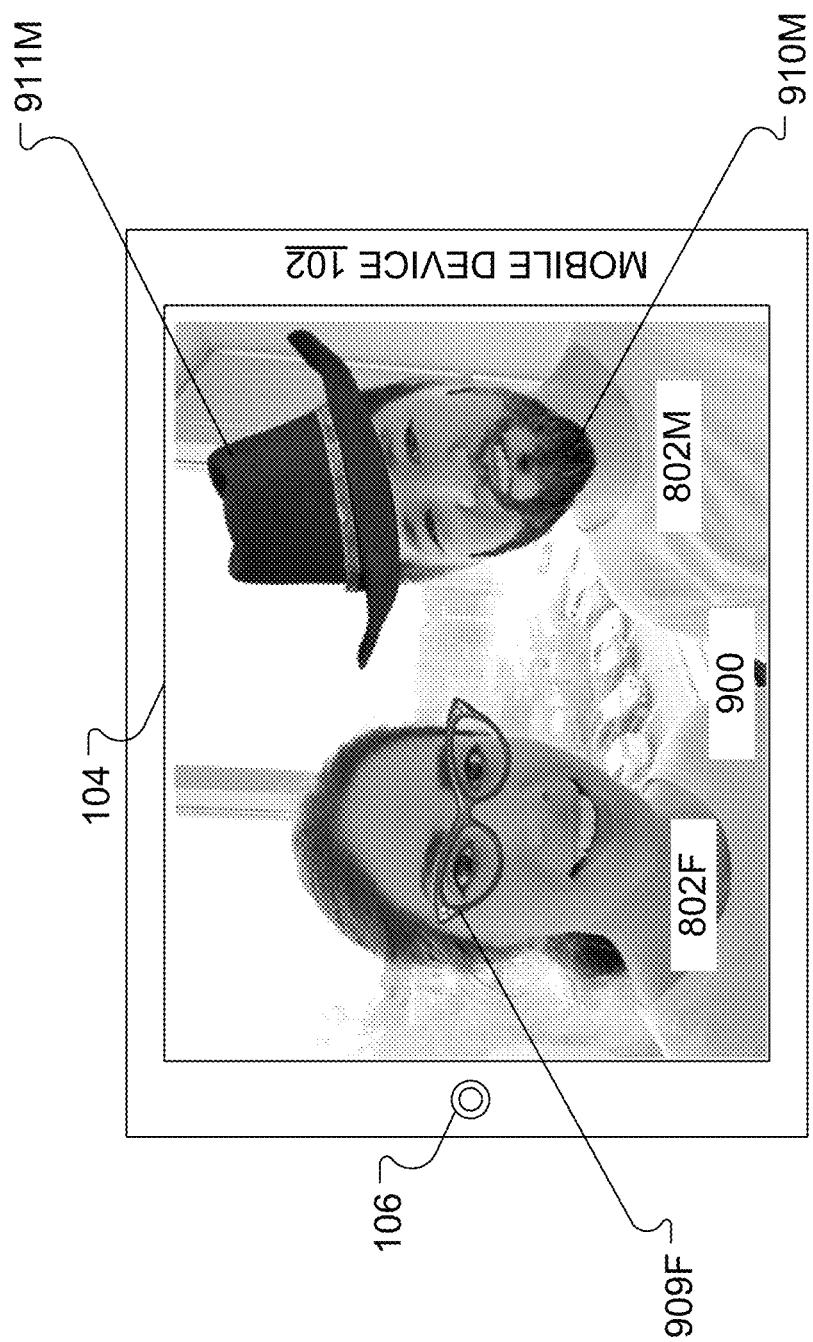
FIG. 9 illustrates an augmented image as presented on the screen of the mobile device of FIG. 1.

FIG. 9 illustrates an augmented image 900 as presented on the display screen 104 of the mobile device 102. Relative to an original image (not shown) representative of an image captured through the front-facing lens 106 of the camera 206 of the mobile device 102, the augmented image 900 of FIG. 9 includes additional, user-selected AR elements. The user-selected AR elements correspond to the face landmarks touched, as illustrated in FIG. 8. In the case of the first person 802M, the augmented image 900 of FIG. 9 includes a beard 910M covering the chin 810M. In the case of the second person 802F, the augmented image 900 of FIG. 9 includes a pair of glasses 909F covering the pair of eyes 809F. Although FIG. 8 does not illustrate the first person 802M touching his forehead, it may be considered that the appearance, in the augmented image 900 of FIG. 9, of a hat 911M covering the forehead of the first person 802M may be attributed to the first person 802M having touched his forehead.

Notably, the pair of glasses 909F may be the default glasses selected, by the interaction control element 306, responsive to identifying (step 708) the eyes 809F as the selected face landmark. Optionally, by repeatedly bringing the fingertip to the eye landmark, the user may cycle through a catalogue of glasses associated with the eyes as a face landmark. Furthermore, in other aspects of the present application, more than one fingertip may be detected by the fingertip detection component, thereby enabling a version of multi-touch on the face surface. The user may increase the distance between an index finger and a thumb, while holding the index finger and the thumb near the eye face landmark. Responsively, the graphics element 308 may process (step 510) the image data for the augmented image 900 to increase a size of the selected glasses. Conversely, responsive to the user pinching the index finger and thumb together, the graphics element 308 may process (step 510) the image data the augmented image 900 to decrease a size of the selected glasses.

Rather than cycling through a catalogue of glasses by repeatedly tapping the eye face landmark, the user may, in a further aspect of the present application, draw glasses around the eye face landmark. Responsive to sensing a shape for the glasses that the user has drawn, the graphics element 308 may process (step 510) the image data to select glasses that most closely match the sensed shape.

In a further aspect of the present application, the user may opt to augment the facial images with virtual make-up. Clearly, a user may touch an appropriate face landmark and cycle through shades of eye shadow, blush or lipstick.

Figure 10:
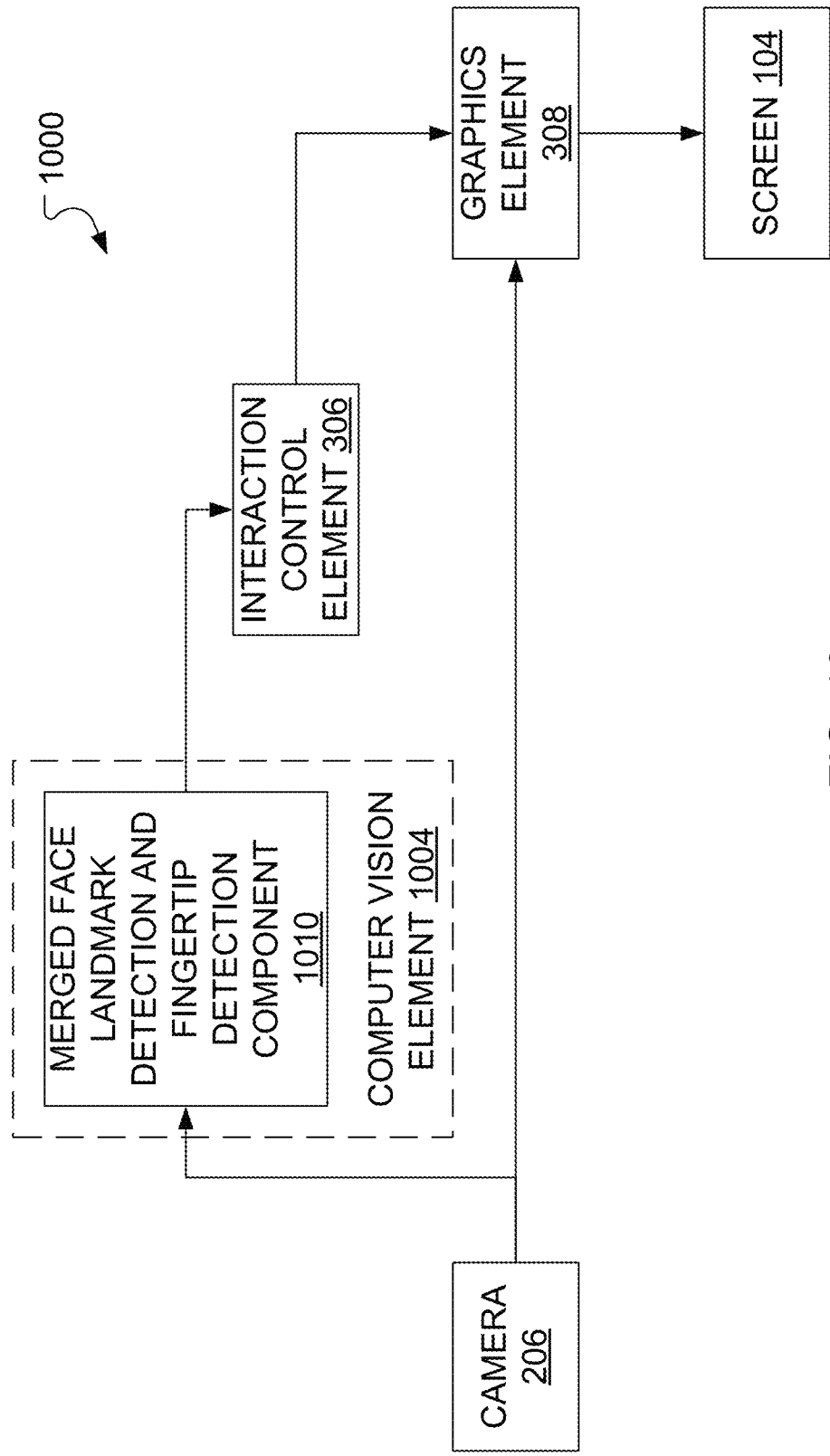
FIG. 10 illustrates a system adapted to carry out aspects of the present application as an alternative to the system of FIG. 3.

FIG. 10 illustrates a system 1000 adapted to carry out aspects of the present application. The system 1000 is an alternative to the system 300 of FIG. 3. The system 1000 includes a computer vision element 1004, the interaction control element 306 and the graphics element 308, the latter two elements are similar to those described with reference to FIG. 3. The system 1000 also includes the camera 206 and the display screen 104, both of which are shown in FIG. 1. The system 1000 also includes components implemented, in software, such as the computer vision element 1004, the interaction control element 306 and the graphics element 308. The software may be stored as machine-readable instructions on the memory 204 and the machine-readable instructions may be executed by the processor 202.

The computer vision element 1004 and to the graphics element 308 receive image data from the camera 206. The computer vision element 1004 is illustrated as having a single component. Instead of the face landmark detection component 310 and the fingertip detection component 312 in the computer vision element 304 of FIG. 3, the computer vision element 1004 of FIG. 10 has a merged face landmark detection and fingertip detection component 1010.

In this embodiment, a deep neural network is used for face landmark detection and fingertip detection 1010. The deep neural network is trained to detect face landmarks and detect the location of a fingertip relative to the detected face landmarks. This stands in contrast to detecting the location of a fingertip relative to a coordinate system, with the same coordinate system being used when detecting face landmarks.

In comparison to the embodiment represented by FIG. 3, the embodiment represented by FIG. 10 is expected to run faster on the mobile device 102 due to using only one trained neural network, rather than two trained neural networks. However, the embodiment represented by FIG. 10 may be considered to involve more effort, in terms of data collection and annotation, than the embodiment represented by FIG. 3.

Aspects of the present application may be considered to be effective, not only for interaction with mobile devices but, also, for interaction with any device having a front-facing camera in combination with a display screen. Such devices may include tablets, e-readers, desktop computers, laptop computers, smart watches, televisions, interactive advertising displays, photo booths and smart mirrors. It may be considered that touch interactions with a smart watch, in particular, are even more challenging than touch interactions with a mobile device due to the small screen size of the typical smart watch.

Advantageously, and as illustrated in the context of FIGS. 8 and 9, aspects of the present application allow for identifying interactions performed by more than one user who are present in the image.

Since the use cases of aspects of the present application are related to the facial elements (e.g., virtual makeup and facial AR), it may be considered that a face-based input channel would be intuitive and easy to understand for users.

Notably, hand-over-face gestures could be useful in other applications not directly related to the face landmarks in the manner that AR elements are related to the face landmarks. Consider a scenario wherein the mobile device 102 is mounted in a car in front of a driver of the car. The mobile device 102 may be mounted at such a distance that reaching the mobile device 102 by hand is challenging. Furthermore, distracted driving laws may discourage the driver from touching the mobile device 102.

Aspects of the present application may be extended generalized beyond mere fingertip detection. Indeed, more than one fingertip may be detected, say, thumb and forefinger, thereby allowing for a pinching gesture for use when interacting with an application providing output to the display screen 104 of the mobile device 102. For example, if the application providing output to the display screen 104 is a mapping application, the application may respond to detection of the pinching by zooming in on a map displayed to the display screen 104. When the location of a fingertip is tracked over time, a gesture may be detected wherein the driver swipes the fingertip across the driver's right cheek. For example, if the application providing output to the display screen 104 is a music streaming application, the application may respond to detection of the swipe across the right cheek by advancing to the next song. For another example, if the application providing output to the display screen 104 is a messaging application, the application may respond to detection of the swipe across the right cheek by proceeding to provide text to voice output of a next message.

Aspects of the present application may relate to controlling settings for the front-facing camera 206. Examples camera settings include: zooming level; shutter release; and brightness. It is clearly convenient that a user may adjust camera settings while the user's face is in the frame captured by the camera. Thus, interactions with face landmarks for controlling the front-facing camera 206 becomes easier especially when the mobile device 102 is in a certain distant from the user.

Figure 11:
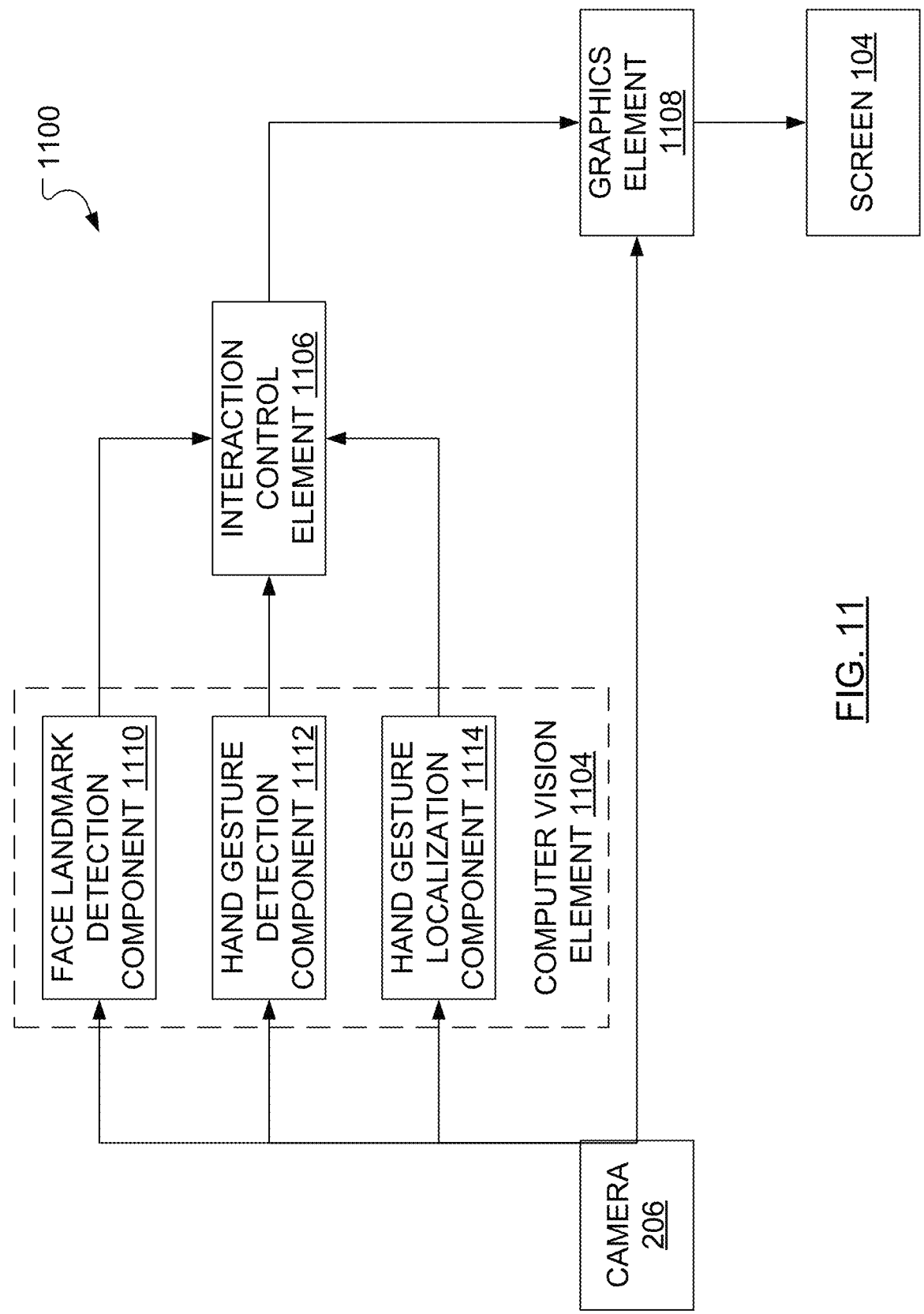
FIG. 11 illustrates a system adapted to carry out aspects of the present application, the system including a computer vision element, an interaction element and a graphics element.

FIG. 11 illustrates a system 1100 adapted to carry out aspects of the present application. The system 1100 includes a computer vision element 1104, an interaction control element 1106 and a graphics element 1108. The system 1100 also includes the camera 206 and the display screen 104, both of which are familiar from FIG. 1. The system 1100 includes components implemented in software, such as the computer vision element 1104, the interaction control element 1106 and the graphics element 1108. The software may be stored as machine-readable instructions on the memory 204 and the machine-readable instructions may be executed by the processor 202.

The camera 206 connects to the computer vision element 1104 and to the graphics element 1108. The computer vision element 1104 is illustrated as having three main components: a face landmark detection component 1110; a hand gesture detection component 1112; and a hand gesture localization component 1114.

In operation, the face landmark detection component 1110 acts to detect face landmarks, the hand gesture detection component 1112 acts to detect a hand gesture over the face and the hand gesture localization component 1114 acts to find coordinates of the hand within received image data. Subsequently, the face landmark detection component 1110 provides a location of a variety of face landmarks to the interaction control element 1106. Additionally, the hand gesture detection component 1112 provides an indication of a hand gesture to the interaction control element 306. Furthermore, the hand gesture localization component 1114 provides the coordinates of the hand to the interaction control element 1106.

Figure 12:
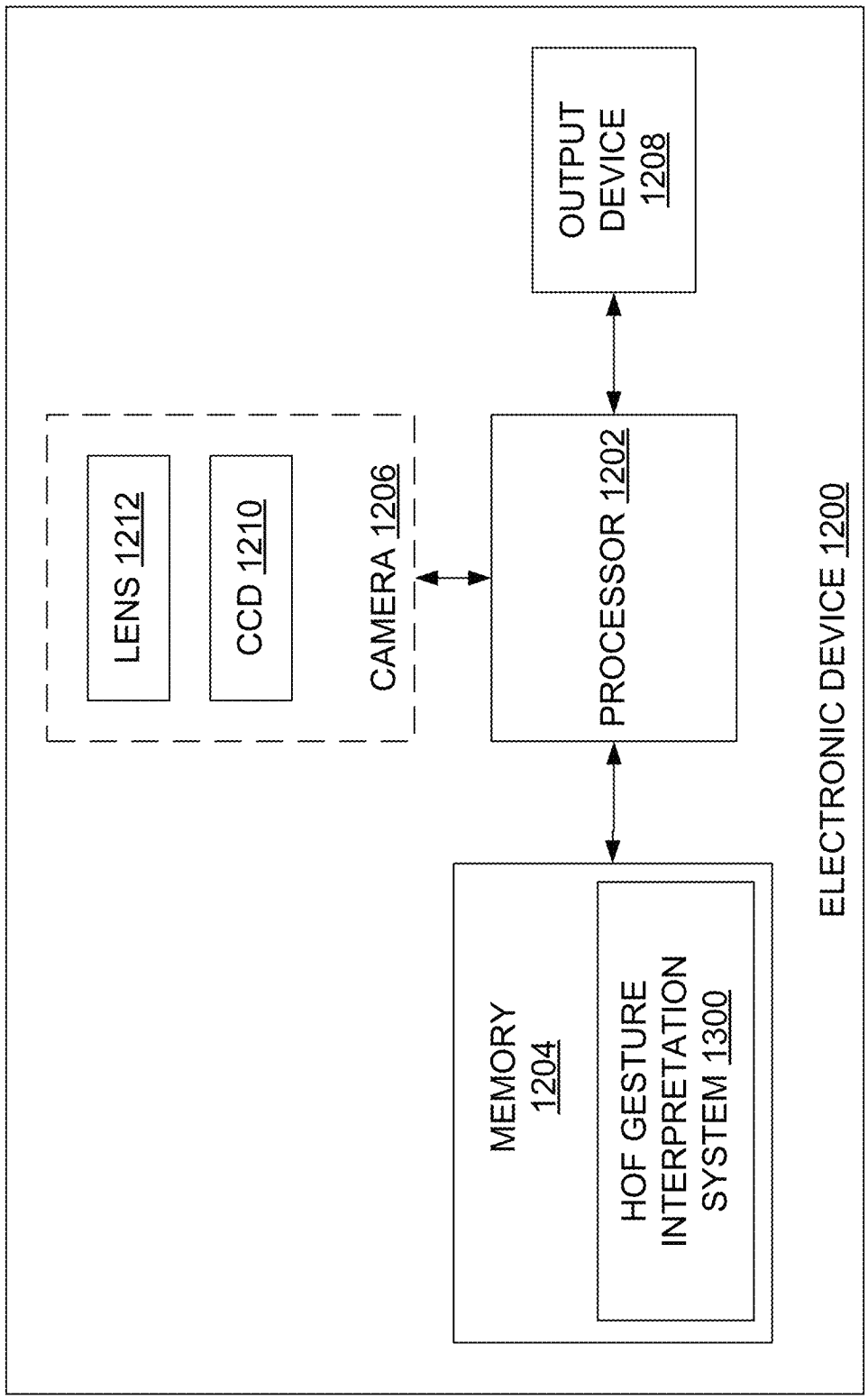
FIG. 12 illustrates a block diagram of an electronic device in accordance with an aspect of the present application.

FIG. 12 illustrates a block diagram of components of an electronic device 1200 according to another embodiment of the present application. Examples of electronic devices include mobile phones, smartphones, tablets, smart televisions, interactive blackboards, vehicle infotainment systems, and the like. The electronic device 1200 includes a processor 1202 that controls the overall operation of the electronic device 1200. The processor 1202 is coupled to and interacts with various other components of the electronic device 1200, including a memory 1204, a camera 1206 and an output device 1208, via, for example, a bus. Components of the camera 1206 include a CCD 1210 and a lens 1212. The output device 1208 may be a display screen, a speaker, or a light sensor. The electronic device 1200 may include one processor 1202 or multiple processors 1202, one memory 1204 or multiple memories 1204, and one output device 1208 or multiple output devices 1208. The memory stores programs, applications, and data of the electronic device 1200.

Figure 13:
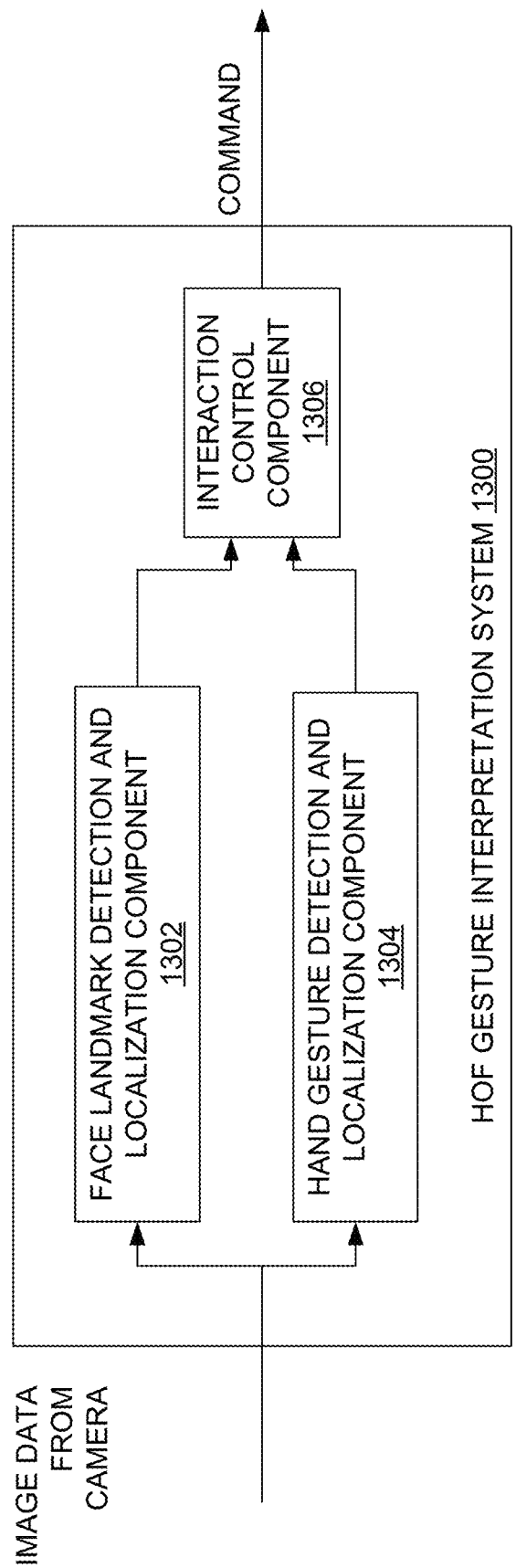
FIG. 13 illustrates a block diagram of a hand-over-face (HOF) gesture interpretation system of the electronic device of FIG. 12 in accordance with an aspect of the present application.

FIG. 13 illustrates a hand-over-face (HOF) gesture interpretation system 1300 according to another aspect of the present application. The HOF gesture interpretation system 1300 may be a software program which includes machine-readable instructions that are stored in memory 1204 of the electronic device 1204. The machine-readable instructions of HOF gesture interpretation system 1300 may be executed by the processor 1202. The (HOF) gesture interpretation system 1300 includes a face landmark detection and localization component 1302, a hand gesture detection and localization component 1304, and an interaction control component 1306. The HOF gesture interpretation system 1300 is configured to receive image data for one or more images captured by the camera 1206, analyze the image data for the one or more images captured by the camera 1206 using computer vision techniques to: detect face landmarks in the one or more images; determine a location for each of the face landmarks in the one or more images; determine a type of hand gesture in the one or more images; and determine a location of the hand gesture in the one or more images. The HOF gesture interpretation system 1300 is also configured to determine a command based on the location of the face landmarks, the type of hand gesture, and the location of hand gesture, and output the command.

Operation of the HOF gesture interpretation system 1300 will now be described. The HOF gesture interpretation system 1300 receives image data for one or more image captured by the camera 1206, which is provided to the face landmark detection and localization component 1302 and the hand gesture detection and localization component 1304. The face landmark detection and localization component 1302 may be software component (e.g., a software module) of the HOF gesture interpretation system 1300 that includes machine-readable instructions which are executable by the processor 1202. The hand gesture detection and localization component 1304 may also be a software component (e.g., a software module) of the HOF gesture interpretation system 1300 that includes machine-readable instructions which are executable by the processor 1202. The interaction control component 1306 may also be a software component (e.g., a software module) of the HOF gesture interpretation system 1300 that includes machine-readable instructions which are executable by the processor 1202.

The face landmark detection and localization component 1302 is configured to receive image data for one or more images captured by the camera 1206, process the image data for the one or more images using computer vision methods to detect one or more face landmarks in the captured image, determine a location of each face landmark detected in the capture image, and output a label indicative of the location of each detected face landmark in the captured image. The hand gesture detection and localization component 1304 is configured to receive image data for one or more images captured by the camera 1206, process the image data for the one or more images using computer vision methods to detect hand gesture in the captured image, determine the type of the detected hand gesture, determine a location for the hand gesture, and output a label indicative of the detected the location of each face landmark in the captured image.

The interaction control component 1306 is coupled to the face landmark detection and localization component 1302 to receive the output from the face landmark detection and localization component 1302. The interaction control component 1306 is also coupled to the hand gesture detection and localization component 1304 to receive the output from the hand gesture detection and localization component 1304.

Figure 14:
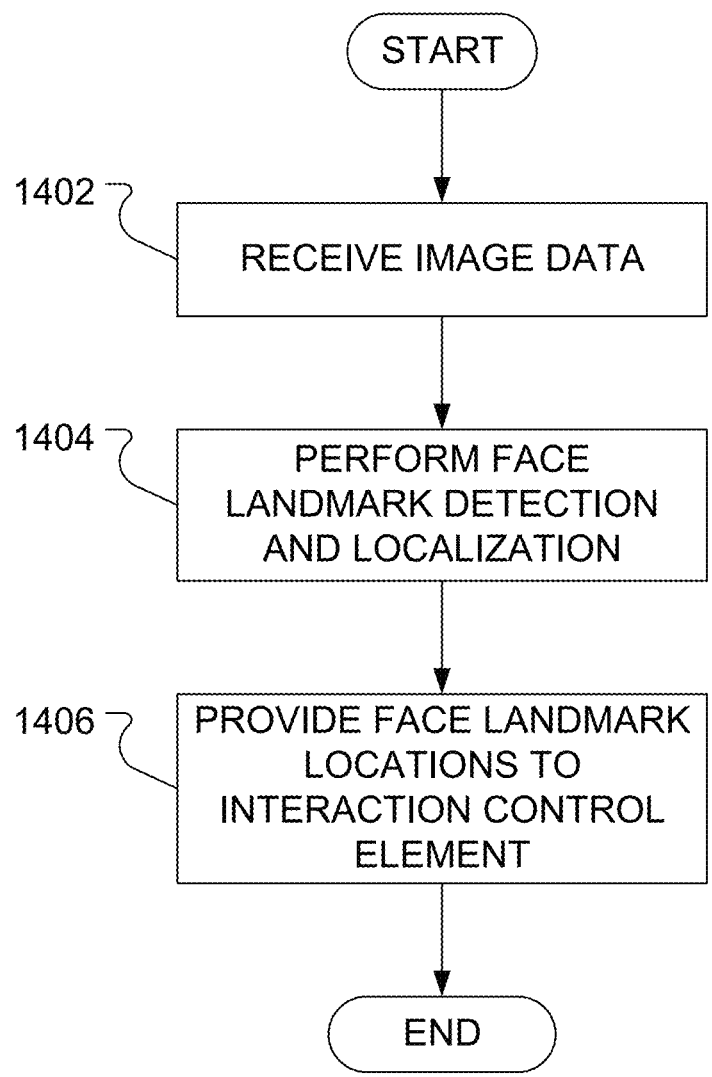
FIG. 14 illustrates a flowchart of a method of operation of a face landmark detection and localization component of HOF gesture interpretation system FIG. 13 in accordance with aspects of the present application.

FIG. 14 illustrates a method performed by the face landmark detection and localization component 1302 (FIG. 13) in accordance with aspects of the present application. The method begins with the face landmark detection and localization component 1302 receiving (step 1402) image data for one or more images captured by the camera 1206. As mentioned as above, the image data for an image is data that is representative of the image. The method then proceeds to step 1404 where the face landmark detection and localization component 1302 performs face landmark detection and localization (step 1404) to detect one or more face landmarks in the captured image, determine a location of each face landmark detected in the capture image, and generates a label that includes identifications of different face landmarks detected in the one or more images (e.g., left eye, nose tip, right cheek). Each face landmark identification may specify a type for the face landmark and a location in the one or more images. After generating the label, the face landmark detection and localization component 1302 provides (step 1406) the label to the interaction control component 1306. The label provided by the face landmark detection and localization component 1302 may be metadata indicative of each face landmark identification.

Figure 15:
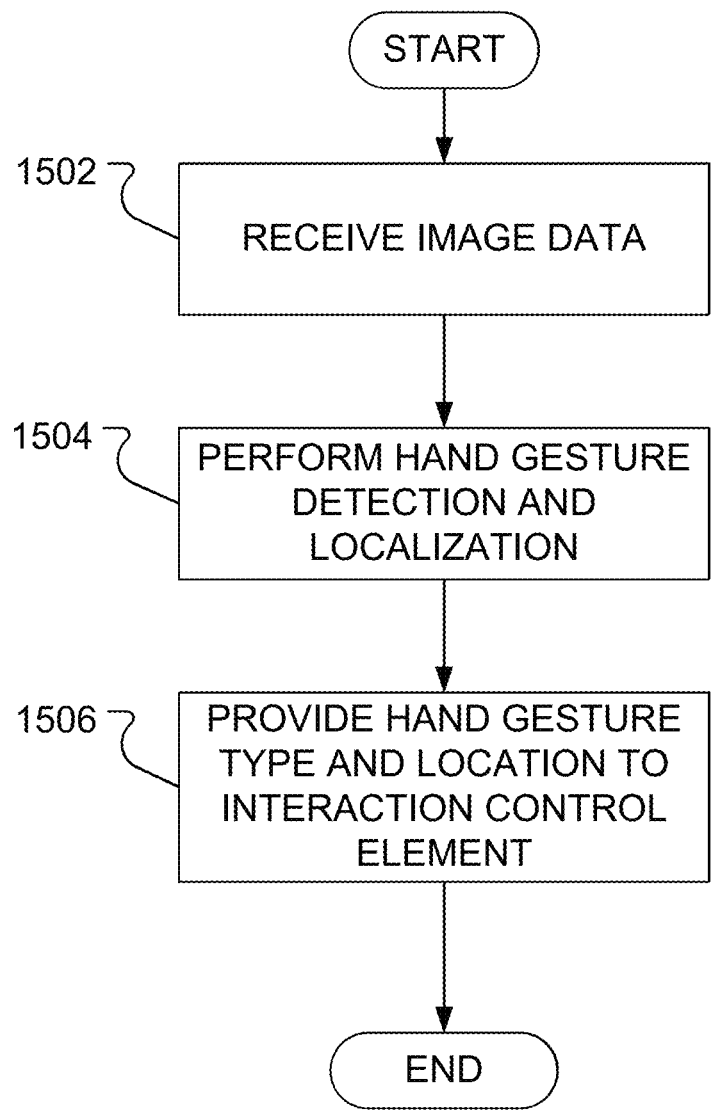
FIG. 15 illustrates a flowchart of a method of operation of a hand gesture detection and localization component of the HOF gesture interpretation system of FIG. 13 in accordance with aspects of the present application.

FIG. 15 illustrates a method performed by the hand gesture detection and localization component 1304 in accordance with aspects of the present application. The method begins with the hand gesture detection and localization component 1304 receiving (step 1502) the image data for one or more images captured by the camera 1206 of the electronic device 1200. The hand gesture detection and localization component 1304 then performs (step 1504) hand gesture detection and localization using a computer vision method to detect a hand gesture in the captured image, determine a type of the hand gesture, determine a location for the hand gesture, and generate a label indicative of the detected the location of each face landmark in the captured image. The label generated by the hand gesture detection and localization component 1304 may, for example, include an identification of a hand gesture. The hand gesture identification may include a type for the hand gesture (e.g., pinch, index finger pointing) and a location in a frame of reference of the one or more images of the hand gesture. After generating the label, the hand gesture detection and localization module 1304 provides the label (step 1506) the to the interaction control module 1306. The label provided by the hand gesture detection and localization module 1304 may be metadata indicative the identification of a hand gesture.

Figure 16:
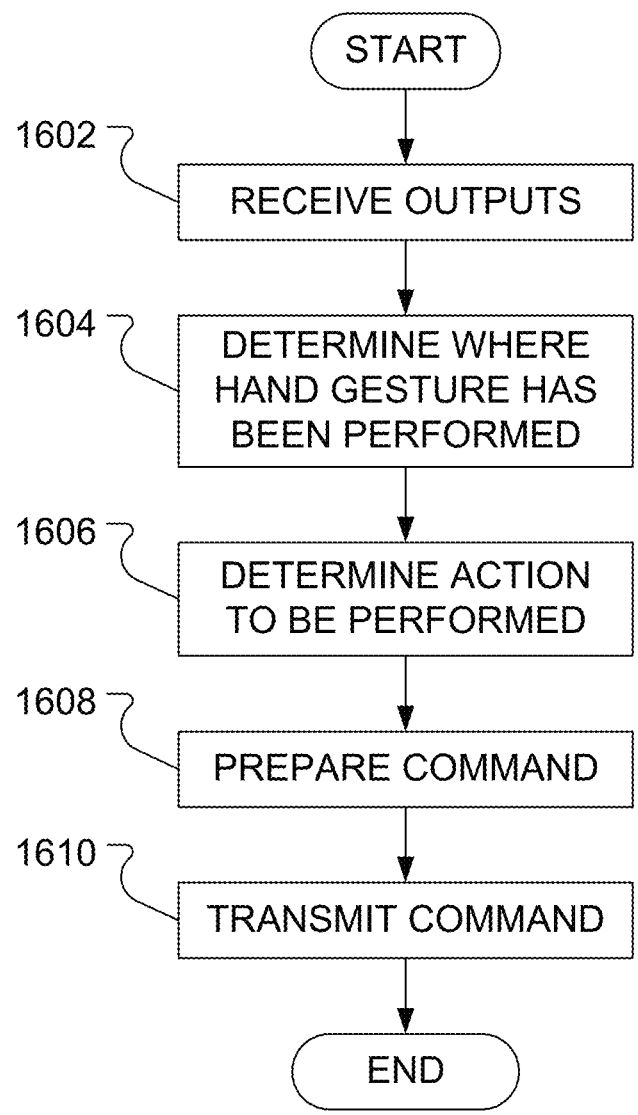
FIG. 16 illustrates a flowchart of a method of operation of an interaction control component of the HOF gesture interpretation system of FIG. 13 in accordance with aspects of the present application.

FIG. 16 illustrates a method performed by the interaction control component 1306 in in accordance with aspects of the present application. The output of the face landmark detection and localization component 1302 and the outputs of the hand gesture detection and localization component 1304 (e.g., the labels provided by the face landmark detection and localization component 1302 and the hand gesture detection and localization component 1304) are received (step 1602) by the interaction control component 1306. The interaction control component 1306 then compares the location of the hand gesture, received (step 1602) from the hand gesture detection and localization component 1304, with the locations of different face landmarks, received (step 1602) from the face landmark detection and localization component 1302, to determine (step 1604) where, on the face (e.g., on cheek, forehead, chin), the hand gesture has been performed. That is, the interaction control component 1306 then determines there is a correspondence between the location for the hand gesture and the location of a selected face landmark among the plurality of face landmarks. The interaction control component 1306 then determines (step 1606) an action that is to be performed by an application or program or hardware component of the electronic device 1200. Depending on the target context, the interaction control component 1306 can determine (step 1606) different actions. The determining (step 1606) may be based on: a) the location at which the hand gesture has been performed on the face; b) the hand gesture type; and c) the application running on the device. The interaction control component 1306 then prepares (step 1608) a command to be sent to a program or application or hardware component of the electronic device 1200, to perform the action and provide feedback to the user. In some aspects, the interaction control component 1306 sends a command indicative of the action to be performed to a program, application or hardware component of the electronic device 1200. The program, application or hardware component performs the action in response to receipt of the command.

The interaction control component 1306 is configured to determine the location of the hand gesture by comparing the face landmarks with the hand gesture location in the captured images; and determine what action is to be performed by the electronic device 1202, based on the type and shape of the hand gesture and the location of the hand gesture. For instance, when the gesture is a pinch on the cheek, the corresponding action may be increasing the zoom level for the camera 1206 of the electronic device 1200. Thus, the interaction control element 1306 is configured to determine a gesture has been performed on the cheek; and determine that a pinching gesture on the cheek corresponds to zooming in on the image. The interaction control element 1306 may then provide the output, including an indication of an action, to the graphics element.

Some actions may not be directly related to an image. For example, a combination of a face landmark and a gesture may be associated with audio volume control.

Applications for aspects of the present application are many and varied. For example, when shopping for cosmetics, aspects may allow a customer to virtually apply a particular shade to a particular location on a representation of the customer's face so that the customer may review the extent to which the shade is suitable for their face. Similarly, aspects my allow a customer to virtually try on a hat, eye glasses, sun glasses and ear rings, among many other possibilities. This aspect may particularly helpful when shopping online.

Aspects of the present application may allow for self-portrait self-editing. Additionally, a customer of a face painter may consider a preview of how the face paint might look when complete.

Aspects of the present application may be used for camera control and audio control. Such control may also be extended to be used to control smart speakers and control other smart home devices, such as smart lights, smart blinds and smart thermostats. In these aspects, the interactive control component 1306 sends a command using a communication interface (not shown) of the electronic device to another electronic device, such as internet of things (IoT) devices (e.g., smartwatches, smart speaker, smart lights, smart blinds and smart thermostats, vehicle infotainment systems) to cause the other electronic device to perform the action.

Voice control may be considered to be one known alternative to employing the face as a touch-based input device for interactions with a device. Conveniently, employing the face as a touch-based input device may be considered to be two-dimensional (or even three-dimensional or four-dimensional if depth and/or facial expression is taken into account). Such multi-dimensional input may, accordingly, be considered to be more efficient than voice input, since voice input may be considered to be linear and sequential. Furthermore, employing the face as a touch-based input device may be considered more natural than voice input and especially efficient for continuous input, like volume control or zooming. Moreover, employing the face as a touch-based input device may be considered to be a more reliable alternative than voice input when the environment includes background noise. Further still, employing the face as a touch-based input device may be considered to be more discreet and less disturbing to others when compared to voice control.

A midair gesture may be considered to be another known alternative to employing the face as a touch-based input device for interactions with a device. In this case, employing the face as a touch-based input device may be considered to have a more reliable implementation due to the additional face structure. Furthermore, employing the face as a touch-based input device may be seen to result in gesture detection that is easier and is associated with a higher accuracy than midair gestures, since facial reference landmark points allow for more precise gesture detection and recognition. Indeed, employing the face as a touch-based input device may be considered to provide a richer interaction than midair gestures. It may further be considered that the addition of face structure provides more natural interaction that available for midair gestures.

The HOF gesture interpretation system 1300 may be always on or may be triggered for operation as described above. When the HOF gesture interpretation system 1300, the HOF gesture interpretation system 1300 could include continuously receive image data for images captured by the camera and, perform gesture detection only when some movement is detected in the captured images. For example, when the HOF gesture interpretation system 1300 detects some pre-defined gestures (e.g., waving, flicking) in the captured image data, this indicates the start and end of the gesture control. Alternatively, the HOF gesture interpretation system 1300 may be triggered for operation by detection of an input on an input device (not shown) of the electronic device 1200. For example, the processor 1202 may detect an input on the input device (not shown) of the electronic device, such as actuation of a physical button or detection of a sound (e.g., clapping, snapping, etc.) or voice command, and active the camera 1206 and the HOF gesture interpretation system 1300 for gesture control.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, central processing units (CPUs), neural processing units (NPUs), tensor processing units (TPUs), hardware accelerators, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of interaction with an electronic device, comprising:
   processing image data for an image captured by a camera to determine a type of a hand gesture in the image and a location of the hand gesture in the image relative to a plurality of face landmark locations in the image;
   determining an action associated with the hand gesture based on the type of the hand gesture and the location of the hand gesture relative to the plurality of face landmark locations in the image; and
   performing the determined action.

2. The method of claim 1, further comprising:
   providing an indication of the determined action.

3. The method of claim 1, comprising:
processing the image data for the image to determine the plurality of face landmark locations in the image.

4. The method of claim 1, comprising:
processing the image data for the image to determine the location of the hand gesture.

5. The method of claim 1, further comprising:
determining a selected face landmark from the plurality of face landmarks having a greatest proximity to the location of the hand gesture based on the location of the hand gesture and the plurality of face landmark locations.

6. The method of claim 5, wherein determining the action is based on the selected face landmark.

7. The method of claim 6, wherein performing the determined action comprises:
selecting, based on the selected face landmark, an augmented reality element to add to the image based on a spatial association between augmented reality elements and face landmarks; and
processing the image data for the image and image data for the selected augmented reality element to generate a processed image having the selected augmented reality element added to the image.

8. The method of claim 7, wherein performing the determined action further comprises:
displaying the processed image on a display screen of the electronic device.

9. The method of claim 1, wherein performing the determined action comprises:
increasing a zoom level of the camera; and
causing the camera to capture a new image at the increased zoom level.

10. The method of claim 1, wherein performing the determined action comprises:
providing a command to an audio control element of the electronic device to change a volume level of the audio control element.

11. The method of claim 1, further comprising:
processing the image data for the image to determine a type of a second hand gesture in the image and a location of the second hand gesture in the image relative to a plurality of face landmark locations in the image;
determining an action associated with the second hand gesture based on the type of the second hand gesture and the location of the second hand gesture relative to the plurality of face landmark locations in the image; and
performing the determined second action.

12. The method of claim 1, wherein the determined action comprises:
generating a processed image having an augmented reality element added to the image, the augmented reality element being selected based on the type of the hand gesture and the location of the hand gesture relative to the plurality of face landmark locations in the image; and
displaying the processed image on a display screen of the electronic device.

13. An electronic device, comprising:
a camera;
a processor configured to:
process image data for an image captured by the camera to determine a type of a hand gesture in the image and a location of the hand gesture in the image relative to a plurality of face landmark locations in the image;
determine an action associated with the hand gesture based on the type of the hand gesture and the location of the hand gesture relative to the plurality of face landmark locations in the image; and
perform the determined action.

14. The electronic device of claim 13, wherein the processor is further configured to:
determine a selected face landmark from the plurality of face landmarks having a greatest proximity to the location of the hand gesture based on the location of the hand gesture and the plurality of face landmark locations.

15. The electronic device of claim 14, wherein the determining the action is based on the selected face landmark.

16. The electronic device of claim 15, wherein the processor, to perform the determined action, is configured to:
select, based on the selected face landmark, an augmented reality element to add to the image based on a spatial association between augmented reality elements and face landmarks; and
process the image data for the image and image data for the selected augmented reality element to generate a processed image having the selected augmented reality element added to the image.

17. The electronic device of claim 13, wherein the processor, to perform the determined action, is further configured to:
display the processed image on a display screen of the electronic device.

18. The electronic device of claim 13, wherein the processor, to perform the determined action, is configured to:
increase a zoom level of the camera; and
cause the camera to capture a new image at the increased zoom level.

19. The electronic device of claim 13, wherein the processor, to perform the determined action, is configured to:
provide a command to an audio control element of the electronic device to change a volume level of the audio control element.

20. The electronic device of claim 13, wherein the processor is further configured to:
Process the image data for the image to determine a type of a second hand gesture in the image and a location of the second hand gesture in the image relative to a plurality of face landmark locations in the image;
determine an action associated with the second hand gesture based on the type of the second hand gesture and the location of the second hand gesture relative to the plurality of face landmark locations in the image; and
perform the determined second action.

21. A non-transitory machine-readable medium having tangibly stored thereon executable instructions for execution by a processor of an electronic device, wherein the executable instructions, in response to execution by the processor, cause the electronic device to:
process image data for an image captured by a camera to determine a type of a hand gesture in the image and a location of the hand gesture in the image relative to a plurality of face landmark locations in the image;
determine an action associated with the hand gesture based on the type of the hand gesture and the location of the hand gesture relative to the plurality of face landmark locations in the image; and
perform the determined action.

* * * * *